United States Patent
Rao et al.

(10) Patent No.: US 10,992,399 B2
(45) Date of Patent: Apr. 27, 2021

(54) METHODS AND APPARATUSES FOR SUPPORTING WIRELESS EMERGENCY ALERT MESSAGES

(71) Applicant: Nokia Solutions and Networks Oy, Espoo (FI)

(72) Inventors: Nagaraja Rao, Boca Raton, FL (US); Alan Jette, Cary, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 21 days.

(21) Appl. No.: 16/603,929

(22) PCT Filed: Apr. 13, 2018

(86) PCT No.: PCT/US2018/027471
§ 371 (c)(1),
(2) Date: Oct. 9, 2019

(87) PCT Pub. No.: WO2018/191605
PCT Pub. Date: Oct. 18, 2018

(65) Prior Publication Data
US 2020/0127749 A1    Apr. 23, 2020

Related U.S. Application Data

(60) Provisional application No. 62/485,069, filed on Apr. 13, 2017.

(51) Int. Cl.
*H04W 4/90* (2018.01)
*H04H 20/59* (2008.01)
(Continued)

(52) U.S. Cl.
CPC .............. *H04H 20/59* (2013.01); *H04W 4/06* (2013.01); *H04W 4/14* (2013.01); *H04W 4/90* (2018.02); *H04W 48/10* (2013.01); *H04W 76/50* (2018.02)

(58) Field of Classification Search
CPC ............. H04H 20/59; H04W 4/06–08; H04W 4/12–14; H04W 4/90; H04W 76/50
See application file for complete search history.

(56) References Cited

U.S. PATENT DOCUMENTS

2005/0176445 A1    8/2005  Qu et al.
2011/0081882 A1    4/2011  Daly et al.
(Continued)

FOREIGN PATENT DOCUMENTS

WO    2016/003174 A1    1/2016

OTHER PUBLICATIONS

3GPP TS 23.041 V13.3.0 (Mar. 2016) 3rd Generation Partnership Project; Technical Specification Group Core Network and Terminals; Technical realization of Cell Broadcast Service (CBS) (Release 13), hereinafter TS23.041. (Year: 2016).*

(Continued)

*Primary Examiner* — Ronald Eisner
(74) *Attorney, Agent, or Firm* — Nokia Technologies Oy

(57) ABSTRACT

Systems, methods, apparatuses, and computer program products for supporting wireless emergency alert messages sent to mobile devices through radio access networks are provided. One method may include utilizing a binary value of 0000 as an update number in wireless emergency alert messages that have short text, utilizing a binary value of 0001 as the update number in wireless emergency alert messages that have long text, broadcasting the short text wireless emergency alert message to mobile devices on a second generation or third generation (2G/3G) network, and broadcasting the long text wireless emergency alert message to mobile devices on a long term evolution (LTE) network.

5 Claims, 26 Drawing Sheets

(51) Int. Cl.
*H04W 76/50* (2018.01)
*H04W 4/06* (2009.01)
*H04W 4/14* (2009.01)
*H04W 48/10* (2009.01)

(56) References Cited

U.S. PATENT DOCUMENTS

2013/0023253 A1  1/2013  Cai et al.
2015/0094010 A1*  4/2015  Grzywacz ............... H04W 4/06
                                                  455/404.1

OTHER PUBLICATIONS

Extended European Search Report received for corresponding European Patent Application No. 18783811.5, dated Sep. 8, 2020, 7 pages.
"Overview 23.041", TSG-RAN Working Group 3 meeting #9, TSGR3#7(99h76), Agenda: 13.1, CMG, Dec. 6-10, 1999, 35 pages.
"3rd Generation Partnership Project; Technical Specification Group Core Network and Terminals; Technical realization of Cell Broadcast Service (CBS) (Release 15)", 3GPP TS 23.041 V15.1.0, Mar. 2018, pp. 1-92.
International Search Report and Written Opinion received for corresponding Patent Cooperation Treaty Application No. PCT/US2018/027471, dated Jul. 16, 2018, 13 pages.

* cited by examiner

METHODS AND APPARATUSES FOR SUPPORTING WIRELESS EMERGENCY ALERT MESSAGES

RELATED APPLICATION

This application was originally filed as Patent Cooperation Treaty Application No. PCT/US2018/027471 filed Apr. 13, 2018 which claims priority benefit to U.S. Provisional Patent Application No. 62/485,069, filed Apr. 13, 2017.

CROSS REFERENCE TO RELATED APPLICATIONS

This application claims priority from U.S. Provisional Application No. 62/485,069, filed on Apr. 13, 2017. The entire contents of this earlier filed application are hereby incorporated by reference in their entirety.

BACKGROUND

Field

Embodiments of the invention generally relate to wireless or mobile communications networks, such as, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A), LTE-A Pro, and/or 5G radio access technology or new radio access technology (NR). Some embodiments may generally relate to emergency alert messages sent through such communications networks.

Description of the Related Art

Universal Mobile Telecommunications System (UMTS) Terrestrial Radio Access Network (UTRAN) refers to a communications network including base stations, or Node Bs, and for example radio network controllers (RNC). UTRAN allows for connectivity between the user equipment (UE) and the core network. The RNC provides control functionalities for one or more Node Bs. The RNC and its corresponding Node Bs are called the Radio Network Subsystem (RNS). In case of E-UTRAN (enhanced UTRAN), no RNC exists and radio access functionality is provided by an evolved Node B (eNodeB or eNB) or many eNBs. Multiple eNBs are involved for a single UE connection, for example, in case of Coordinated Multipoint Transmission (CoMP) and in dual connectivity.

Long Term Evolution (LTE) or E-UTRAN refers to improvements of the UMTS through improved efficiency and services, lower costs, and use of new spectrum opportunities. In particular, LTE is a 3GPP standard that provides for uplink peak rates of at least, for example, 75 megabits per second (Mbps) per carrier and downlink peak rates of at least, for example, 300 Mbps per carrier. LTE supports scalable carrier bandwidths from 20 MHz down to 1.4 MHz and supports both Frequency Division Duplexing (FDD) and Time Division Duplexing (TDD).

As mentioned above, LTE may also improve spectral efficiency in networks, allowing carriers to provide more data and voice services over a given bandwidth. Therefore, LTE is designed to fulfill the needs for high-speed data and media transport in addition to high capacity voice support. Advantages of LTE include, for example, high throughput, low latency, FDD and TDD support in the same platform, an improved end-user experience, and a simple architecture resulting in low operating costs.

Certain releases of 3GPP LTE (e.g., LTE Rel-10, LTE Rel-11, LTE Rel-12, LTE Rel-13) are targeted towards international mobile telecommunications advanced (IMT-A) systems, referred to herein for convenience simply as LTE-Advanced (LTE-A).

LTE-A is directed toward extending and optimizing the 3GPP LTE radio access technologies. A goal of LTE-A is to provide significantly enhanced services by means of higher data rates and lower latency with reduced cost. LTE-A is a more optimized radio system fulfilling the international telecommunication union-radio (ITU-R) requirements for IMT-Advanced while maintaining backward compatibility. One of the key features of LTE-A, introduced in LTE Rel-10, is carrier aggregation, which allows for increasing the data rates through aggregation of two or more LTE carriers.

$5^{th}$ generation (5G) or new radio (NR) wireless systems refer to the next generation (NG) of radio systems and network architecture. 5G is expected to provide higher bitrates and coverage than the current LTE systems. It is estimated that 5G will provide bitrates one hundred times higher than LTE offers (e.g., on the order of 10-20 Gbit/s). 5G will support at least enhanced mobile broadband (eMBB) and ultra-reliable low-latency-communication (URLLC). 5G is also expected to increase network expandability up to hundreds of thousands of connections. The signal technology of 5G is anticipated to be improved for greater coverage as well as spectral and signaling efficiency. 5G is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. In 5G or NR, the node B or eNB may be referred to as a next generation node B (gNB).

SUMMARY

One embodiment is directed to a method that may include utilizing, by a network node, a binary value of 0000 as an Update Number in all WEA messages that have Short text (e.g., 90-character text) such that a Message Identifier/Serial Number combination will be of the form of <M1, S0> or <M1, C1, U0> (i.e., <Message Identifier, Message Code, Update Number of value 0000B>), and utilizing a binary value of 0001 as the Update Number in all of the WEA messages that have Long text (e.g., 360-character text) such that the Message Identifier/Serial Number combination will be of the form of <M1, S1> or <M1, C1, U1> (i.e., <Message Identifier, Message Code, Update Number of value 0001B>). In an embodiment, the method may also include broadcasting the Short text WEA message to mobile devices on a 2G/3G network with <M1, S0> (or <M1, C1, U0> or <Message Identifier, Message Code, Update Number of value 0000B>) as the Message Identifier/Serial Number combination. In an embodiment, the method may also include broadcasting the Long text WEA message on a LTE network with <M1, S1> (or <M1, C1, U1> or <Message Identifier, Message Code, Update Number of value 0001B>) as the Message Identifier/Serial Number combination.

Another embodiment is directed to an apparatus that may include at least one processor and at least one memory including computer program code. The at least one memory and the computer program code are configured, with the at least one processor, to cause the apparatus at least to utilize a binary value of 0000 as an Update Number in all WEA messages that have Short text (e.g., 90-character text) such that a Message Identifier/Serial Number combination will be of the form of <M1, S0> or <M1, C1, U0> (i.e., <Message Identifier, Message Code, Update Number of value 0000B>), and to utilize a binary value of 0001 as the Update Number in all of the WEA messages that have Long text (e.g., 360-character text) such that the Message Identifier/Serial Number combination will be of the form of <M1, S1> or <M1, C1, U1> (i.e., <Message Identifier, Message Code, Update Number of value 0001B>). In an embodiment, the at least one memory and the computer program code are configured, with the at least one processor, to cause the apparatus at least to broadcast the Short text WEA message to mobile devices on a 2G/3G network with <M1, S0> (or <M1, C1, U0> or <Message Identifier, Message Code, Update Number of value 0000B>) as the Message Identifier/Serial Number combination, and/or to broadcast the Long text WEA message on a LTE network with <M1, S1> (or <M1, C1, U1> or <Message Identifier, Message Code, Update Number of value 0001B>) as the Message Identifier/Serial Number combination.

Another embodiment is directed to an apparatus that may include means for utilizing a binary value of 0000 as an Update Number in all WEA messages that have Short text (e.g., 90-character text) such that a Message Identifier/Serial Number combination will be of the form of <M1, S0> or <M1, C1, U0> (i.e., <Message Identifier, Message Code, Update Number of value 0000B>), and means for utilizing a binary value of 0001 as the Update Number in all of the WEA messages that have Long text (e.g., 360-character text) such that the Message Identifier/Serial Number combination will be of the form of <M1, S1> or <M1, C1, U1> (i.e., <Message Identifier, Message Code, Update Number of value 0001B>). In an embodiment, the apparatus may also include means for broadcasting the Short text WEA message to mobile devices on a 2G/3G network with <M1, S0> (or <M1, C1, U0> or <Message Identifier, Message Code, Update Number of value 0000B>) as the Message Identifier/Serial Number combination. In an embodiment, the apparatus may also include means for broadcasting the Long text WEA message on a LTE network with <M1, S1> (or <M1, C1, U1> or <Message Identifier, Message Code, Update Number of value 0001B>) as the Message Identifier/Serial Number combination.

Another embodiment is directed to a method that may include receiving, when a UE in a 2G/3G network, a Short text (e.g., 90-character) WEA message with <M1, S0> (i.e., <Message Identifier, Message Code, Update Number of value 0000B>) as the Message Identifier/Serial Number combination, and/or receiving, when the UE is in a LTE network, a Long text (e.g., 360-character) message with <M1, S1> (i.e., <Message Identifier, Message Code, Update Number of value 0001B>) as the Message Identifier/Serial Number combination. The method may also include performing duplicate detection to determine, by the UE, whether to display a received WEA message. For example, in an embodiment, the performing may include using the value <M1, C1> (i.e., <Message Identifier, Message Code>) to perform duplication detection and Update Number to determine whether there is a change in the content of a received WEA message. For example, when a Long text WEA message is received at the UE while on LTE after it has received a Short text WEA message while on 2G/3G, and the UE determines that there is a change in the content based on the value <M1, C1> (i.e., <Message Identifier, Message Code>) or the Update Number, then the method may further include displaying the Long text WEA message. When a Short text WEA message is received at the UE while on 2G/3G after it had received a Long text WEA message while on LTE, and the UE determines that there is no change in the content based on the value <M1, C1> (i.e., <Message Identifier, Message Code>) or the Update Number, then the method may include discarding the Short text WEA message without displaying it.

Another embodiment is directed to an apparatus that may include at least one processor and at least one memory including computer program code. The at least one memory and the computer program code are configured, with the at least one processor, to cause the apparatus at least to receive, when the apparatus in a 2G/3G network, a Short text (e.g., 90-character) WEA message with <M1, S0> (i.e., <Message Identifier, Message Code, Update Number of value 0000B>) as the Message Identifier/Serial Number combination, and/or receive, when the apparatus is in a LTE network, a Long text (e.g., 360-character) message with <M1, S1> (i.e., <Message Identifier, Message Code, Update Number of value 0001B>) as the Message Identifier/Serial Number combination. The at least one memory and the computer program code are configured, with the at least one processor, to cause the apparatus at least to perform duplicate detection to determine whether to display a received WEA message. For example, in an embodiment, the at least one memory and the computer program code are configured, with the at least one processor, to cause the apparatus at least to use the value <M1, C1> (i.e., <Message Identifier, Message Code>) to perform duplication detection and Update Number to determine whether there is a change in the content of a received WEA message. For example, when a Long text WEA message is received at the apparatus while on LTE after it has received a Short text WEA message while on 2G/3G, and the apparatus determines that there is a change in the content based on the value <M1, C1> (i.e., <Message Identifier, Message Code>) or the Update Number, then the at least one memory and the computer program code are configured, with the at least one processor, to cause the apparatus at least to display the Long text WEA message. When a Short text WEA message is received at the apparatus while on 2G/3G after it had received a Long text WEA message while on LTE, and the apparatus determines that there is no change in the content based on the value <M1, C1> (i.e., <Message Identifier, Message Code>) or the Update Number, then the at least one memory and the computer program code are configured, with the at least one processor, to cause the apparatus at least to discard the Short text WEA message without displaying it.

Another embodiment is directed to a UE that may include means for receiving, when the UE in a 2G/3G network, a Short text (e.g., 90-character) WEA message with <M1, S0> (i.e., <Message Identifier, Message Code, Update Number of value 0000B>) as the Message Identifier/Serial Number combination, and/or means for receiving, when the UE is in a LTE network, a Long text (e.g., 360-character) message with <M1, S1> (i.e., <Message Identifier, Message Code, Update Number of value 0001B>) as the Message Identifier/Serial Number combination. The UE may also include performing means for performing duplicate detection to determine whether to display a received WEA message. For example, in an embodiment, the performing means may include means for using the value <M1, C1> (i.e., <Message Identifier, Message Code>) to perform duplication detection and Update Number to determine whether there is a change in the content of a received WEA message. For example, when a Long text WEA message is received at the UE while on LTE after it has received a Short text WEA message while on 2G/3G, and the UE determines that there is a change in the content based on the value <M1, C1> (i.e., <Message Identifier, Message Code>) or the Update Number, then the apparatus may further include means for displaying the Long text WEA message. When a Short text WEA message is received at the UE while on 2G/3G after it had received a Long text WEA message while on LTE, and the UE determines that there is no change in the content based on the value <M1, C1> (i.e., <Message Identifier, Message Code>) or the Update Number, then the apparatus may include means for discarding the Short text WEA message without displaying it.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of systems, methods, apparatuses, and computer program products for supporting wireless emergency alert messages sent to mobile devices through radio access networks (i.e., cellular networks), as represented in the attached figures and described below, is not intended to limit the scope of the invention but is representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments.

Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

Certain embodiments relate to wireless technology where emergency warning notifications are sent to mobile devices through cellular or radio access networks, such as UMTS, LTE, 5G, NR, or the like. The regulatory requirements that relate to the emergency warning notifications is known as Wireless Emergency Alerts (WEAs) which is part of a larger Public Warning System (PWS) defined in the 3GPP standards. Specific requirements of WEA are also defined in the Alliance for Telecommunications Industry Solutions (ATIS) standards.

As will be discussed in more detail below, one embodiment may relate to the broadcast of 90-character and 360-character messages and may provide some changes to way the messages are broadcast and the duplication detection logic within the mobile devices.

Figure 1:
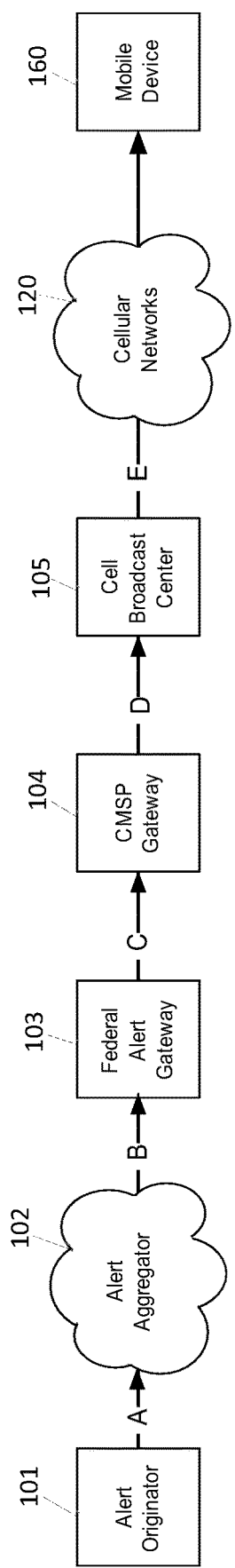
FIG. 1 illustrates an example block diagram of an end-to-end architecture for a WEA message transmission, according to one embodiment.

FIG. 1 illustrates an example block diagram of an end-to-end architecture for a WEA message transmission, according to one embodiment. The notations "A" through "E" indicate the reference points (interfaces) used between the network entities depicted in FIG. 1. The network entities involved may include an alert originator 101 that issues a WEA message that is transferred to a federal alert gateway 103 via an alert aggregator 102, for example. The federal alert gateway 103 may forward the message to a commercial mobile service provider (CMSP) gateway 104, which then provides it to a cell broadcast center (CBC) 105 for broadcast to mobile devices 160 via cellular networks 120. The WEA messages may be text messages that are displayed on a screen of mobile device 160, for example. In an embodiment, the network 120 may broadcast the WEA messages using the Cell Broadcast Service (CBS) message format.

During an emergency-situation that causes the alert originators 101 to issue a warning notification, the network 120 may repeat the broadcast of the WEA message for the duration of the alert to allow the mobile devices 160 that enter the broadcast area (or are powered on) after the previous broadcasts to receive the WEA message. The duration of the alert may be specified by the alert originators 101, and the repetition period may be determined based on operator policy. In one embodiment, the mobile devices 160 that had previously displayed the text characters of a WEA message may discard all the subsequently received repeated messages. It is noted that the technique used within the mobile devices 160 to detect and discard a repeated message is referred to as duplication detection logic.

Figure 2:
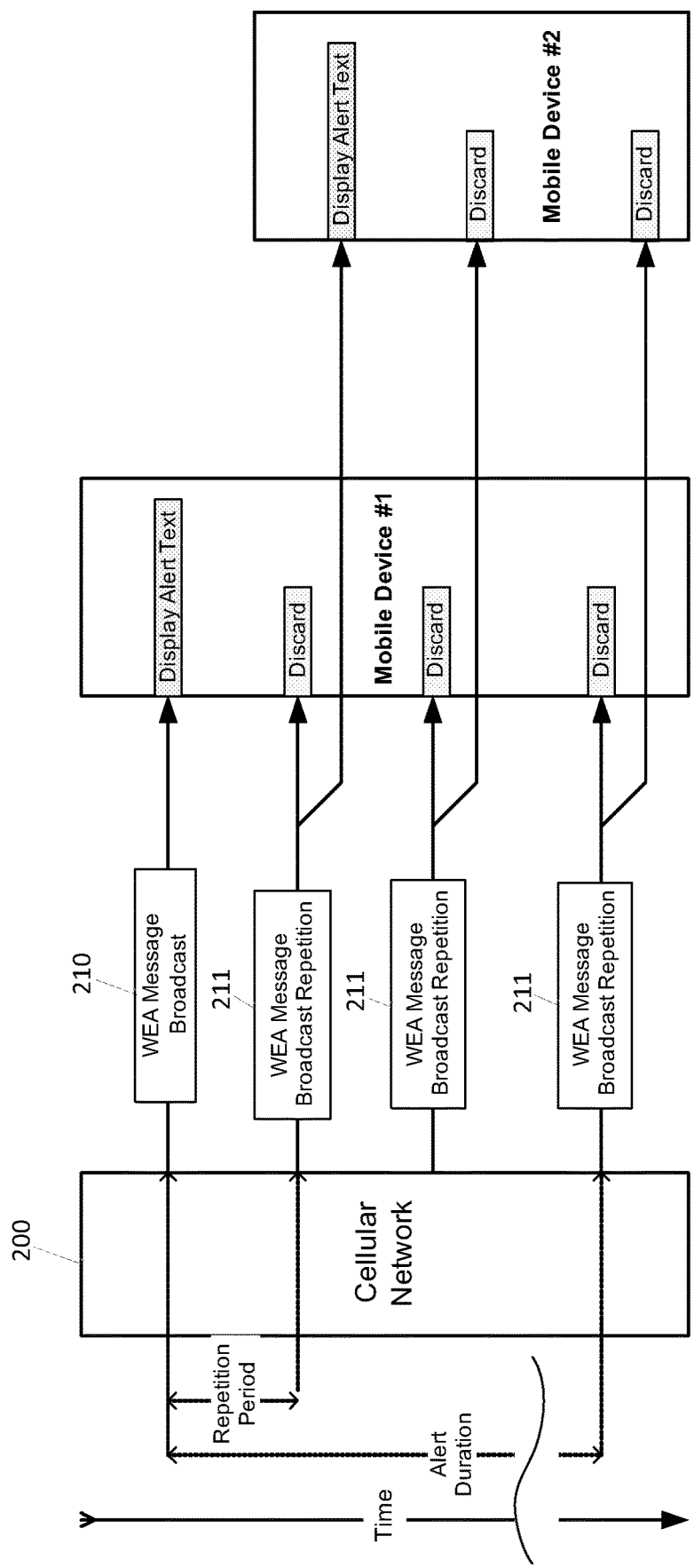
FIG. 2 illustrates a block diagram depicting an example of a system for carrying out a WEA message broadcast.

FIG. 2 illustrates a block diagram depicting an example of a system for carrying out a WEA message broadcast. In the example of FIG. 2, two mobile devices are depicted, mobile device 1 and mobile device 2. It is noted that any number of mobile devices may be supported according to other embodiments. In the example of FIG. 2, mobile device 1 is in the area at the beginning of the alert, while mobile device 2 enters the area sometime later but before the alert expires. Since mobile device 1 is in the coverage area when the alert begins, mobile device 1 receives and displays the initial WEA broadcast message 210. When mobile device 2 enters the coverage area, mobile device 2 receives and displays the first repetition of the WEA message broadcast repetitions 211. Therefore, as illustrated in FIG. 2, both mobile devices receive and display the WEA message 210 or 211 text once and discard all the subsequently received (but repeated) WEA messages 210.

Figure 3:
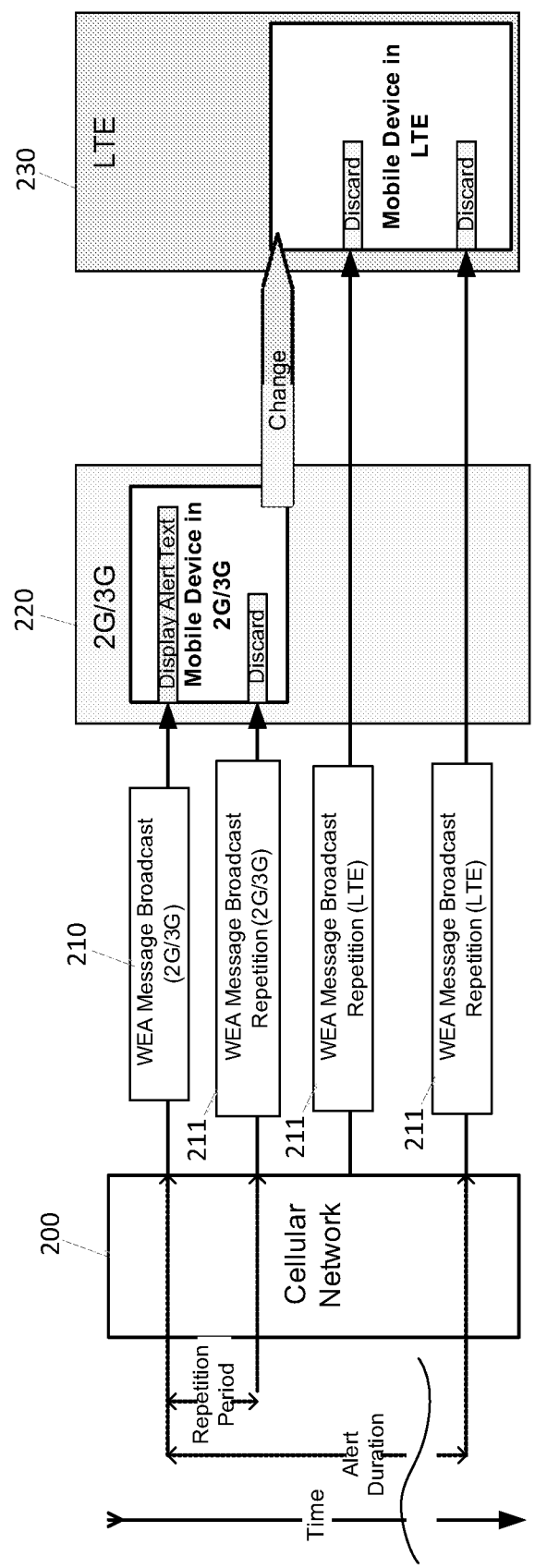
FIG. 3 illustrates an example block diagram depicting WEA broadcasts and radio access network (RAN) change at the mobile device.

Operators have indicated that the duplication detection logic within the mobile devices applies even if the mobile devices change the radio access network (e.g., UMTS to LTE, and vice versa). In other words, a mobile device would continue to discard the subsequently received repeated WEA messages independent of which radio access network (2G/3G or LTE or 5G) it is connected to. FIG. 3 illustrates an example block diagram depicting WEA broadcasts and radio access network (RAN) change at the mobile device. FIG. 3 illustrates that the mobile device displays the WEA message text while on a 2G/3G network 220 and discards all the subsequently received (but repeated) WEA messages irrespective of whether it is connected to the 2G/3G radio or subsequently moves to LTE network 230.

Recently, the Federal Communications Commission (FCC) has issued a new report and order (FCC 16-127) that requires support for up to 360 characters of text for WEA messages broadcast to mobile devices on LTE networks. As per the FCC new report and order, for 2G/3G networks (e.g., GSM, UMTS, CDMA, CDMA2000), the previous 90-character limit will continue to apply. As such, operators suspect that the current duplication detection logic employed within mobile devices may have to be modified to address the scenario of the mobile devices changing RANs. For example, operators have indicated that a mobile device which first receives and displays a 90-character WEA message while on a 2G/3G RAN may have to display the 360-character message (instead of discarding it) when it switches to a LTE RAN because a 360-character message is expected to have additional information. On the other hand, a mobile device that first receives and displays a 360-character message while on a LTE RAN may discard the subsequently received 90-character message when it switches to a 2G/3G RAN because a 90-character display would be condensed version of 360-character display. Certain embodiments address these problems and provide one or more methods that may be used to address the above requirement.

It should be noted that, as used herein, 2G/3G networks may refer to any network that only supports a short text (e.g., 90-character) limit for WEA messages. Thus, for example, 2G/3G may refer to at least one or more of GSM, UMTS, CDMA, CDMA2000 networks. In addition, as used herein, LTE networks may refer to any network that supports the long text (e.g., 360 character) limit for WEA messages. Therefore, for example, in addition to LTE networks, LTE as used herein may refer to one or more of LTE-A, LTE-A Pro, 5G, NR, or any other future radio access network.

Embodiments described in the present disclosure may address several scenarios. One scenario may include where a 90-character message is sent over 2G/3G and LTE radio networks. This scenario may occur, for example, when the alert originators construct a 90-character message intended to all users.

A second scenario may include where a 90-character message is sent over 2G/3G networks and a 360-character message is sent over newer generation networks such as LTE networks. This second scenario may occur, for example, when the alert originators construct, in addition to the 90-character message, an additional 360-character message intended to LTE users.

It is noted that, as used for certain embodiments described herein, a "90-character message" may mean that a WEA message contains up to 90 display characters and a "360-character message" may mean that a WEA message contains up to 360 display characters.

A third scenario may include where the alert originators construct just a 360-character message, and the Federal Alert Gateway for example locally constructs a 90-character message intended for the 2G/3G users. According to certain embodiments, this third scenario may be treated similarly to the scenario where the alert originators construct two separate messages for 2G/3G and LTE, respectively, because in both scenarios the 90-character message will be broadcast over 2G/3G networks, and the 360-character message will be broadcast over the LTE networks.

Figure 4:
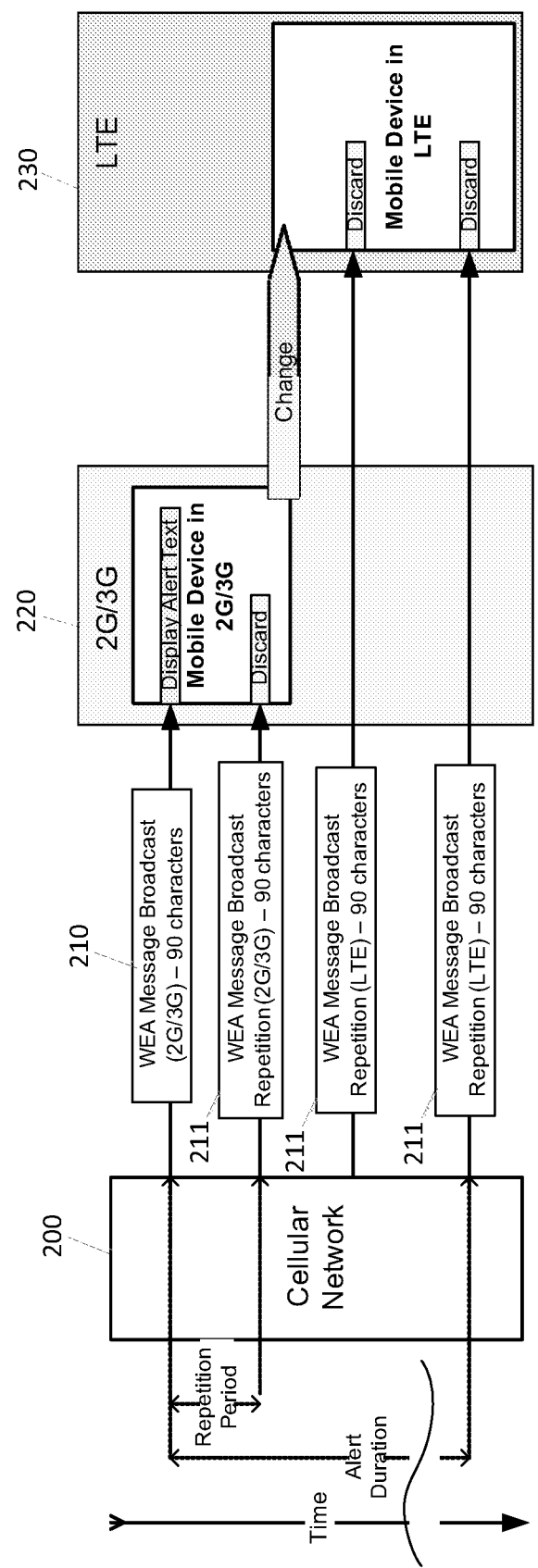
FIG. 4 illustrates an example block diagram depicting WEA broadcasts and radio access network (RAN) change from a 2G/3G network to LTE at the mobile device where all of the WEA messages are short text.
Figure 5:
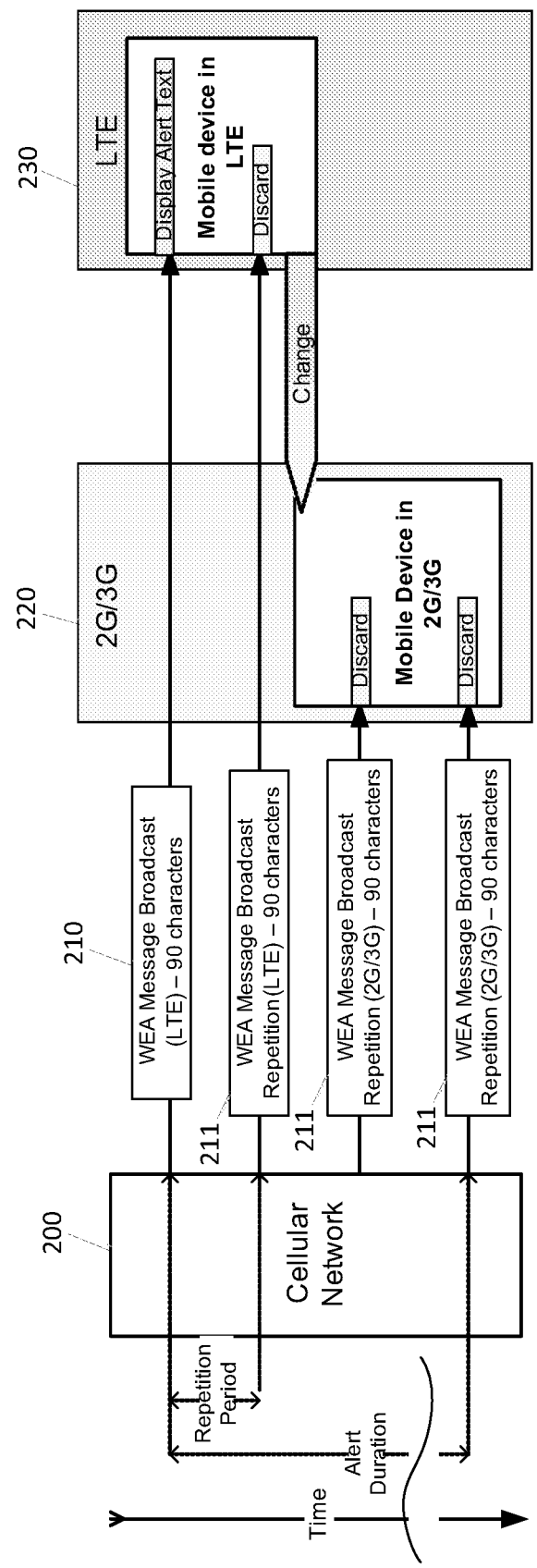
FIG. 5 illustrates another example block diagram depicting WEA broadcasts and radio access network (RAN) change from LTE network to a 2G/3G network at the mobile device where all of the WEA messages are short text.

As illustrated in FIG. 3 introduced above, mobile devices are expected to discard the repeated WEA messages independent of which radio access networks they are connected to. FIG. 4 illustrates an example block diagram similar to FIG. 3, but specifically illustrates the scenario where all of the WEA messages 210, 211 are "90-characters". More specifically, FIG. 4 illustrates the example where a mobile device receives the 90-character WEA message while on a 2G/3G network 220 and displays the alert text. The mobile device then discards all the subsequent repeated messages even if it changes its radio access connection to a LTE network 230. FIG. 5 illustrates an example block diagram where the mobile device is first on a LTE network 230 and then changes to a 2G/3G network 220. As depicted in FIG. 5, after first receiving the message while on the LTE network 230, the mobile device may discard all of the subsequently repeated message even if it changes its radio access connection to a 2G/3G network 220.

Figure 6:
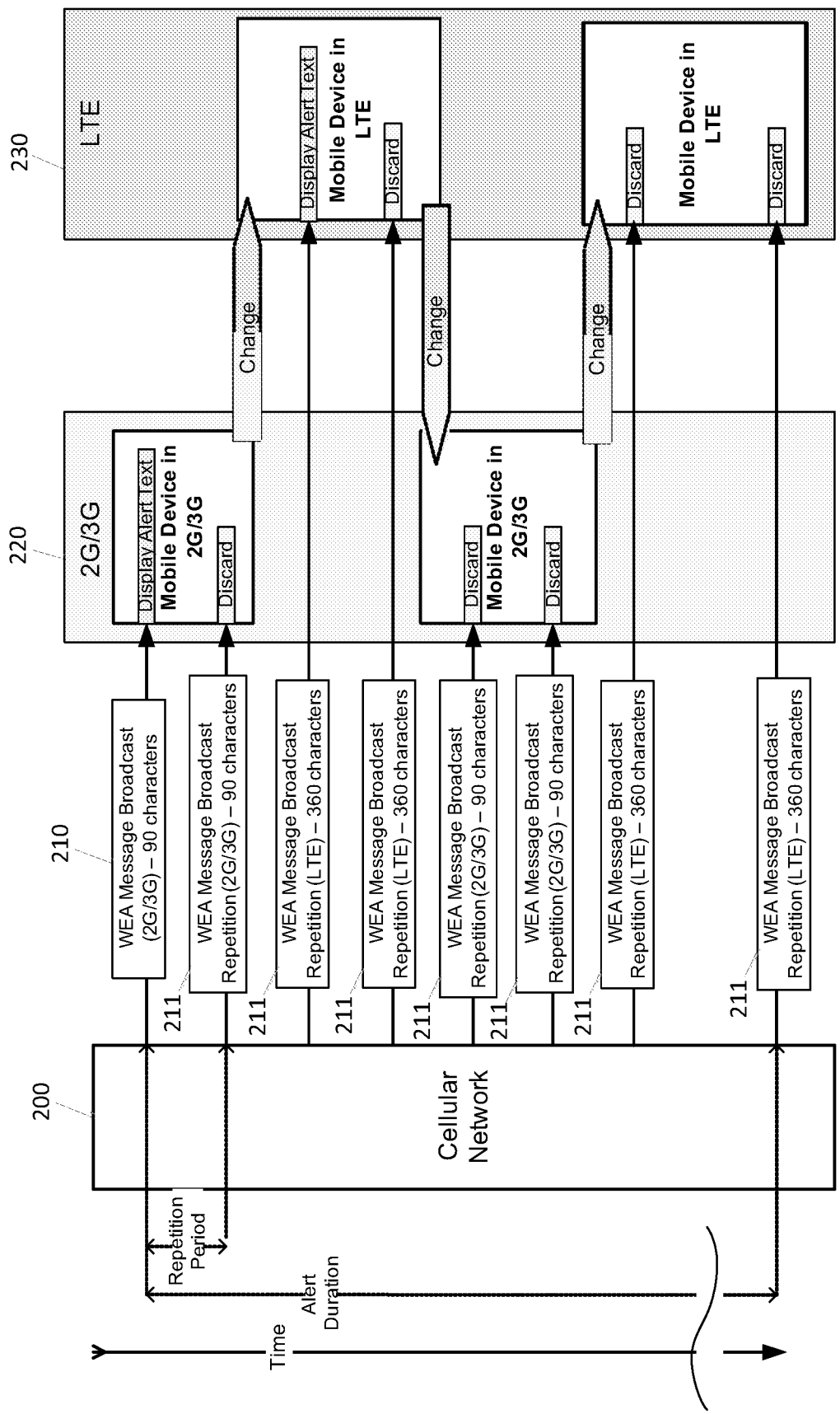
FIG. 6 illustrates a block diagram depicting an example of RAN change at a mobile device from 2G/3G to LTE.

In the case where a 90-character message is sent to mobile devices on 2G/3G networks and 360-character messages to mobile devices on LTE networks, mobile devices when changing the radio access network from 2G/3G to LTE (the very first time) should display the 360-character message even if it had previously displayed 90-character text of the related (or associated) message while on 2G/3G. However, the subsequent reception of a repeated 360-character message or a 90-character message shall be discarded. FIG. 6 illustrates a block diagram depicting an example of this approach, according to an embodiment. As illustrated in the example of FIG. 6, a mobile device receives the 90-character WEA message while on 2G/3G network 220 and displays the alert text. The mobile device then discards all the subsequent received repeated messages while on the 2G/3G network 220. The mobile device is expected to receive the related 360-character message, the first time it changes its radio access from 2G/3G network 220 to LTE network 230 but, from there onward, it is expected to discard the repeated messages independent of which radio access network it is connected to.

Figure 7:
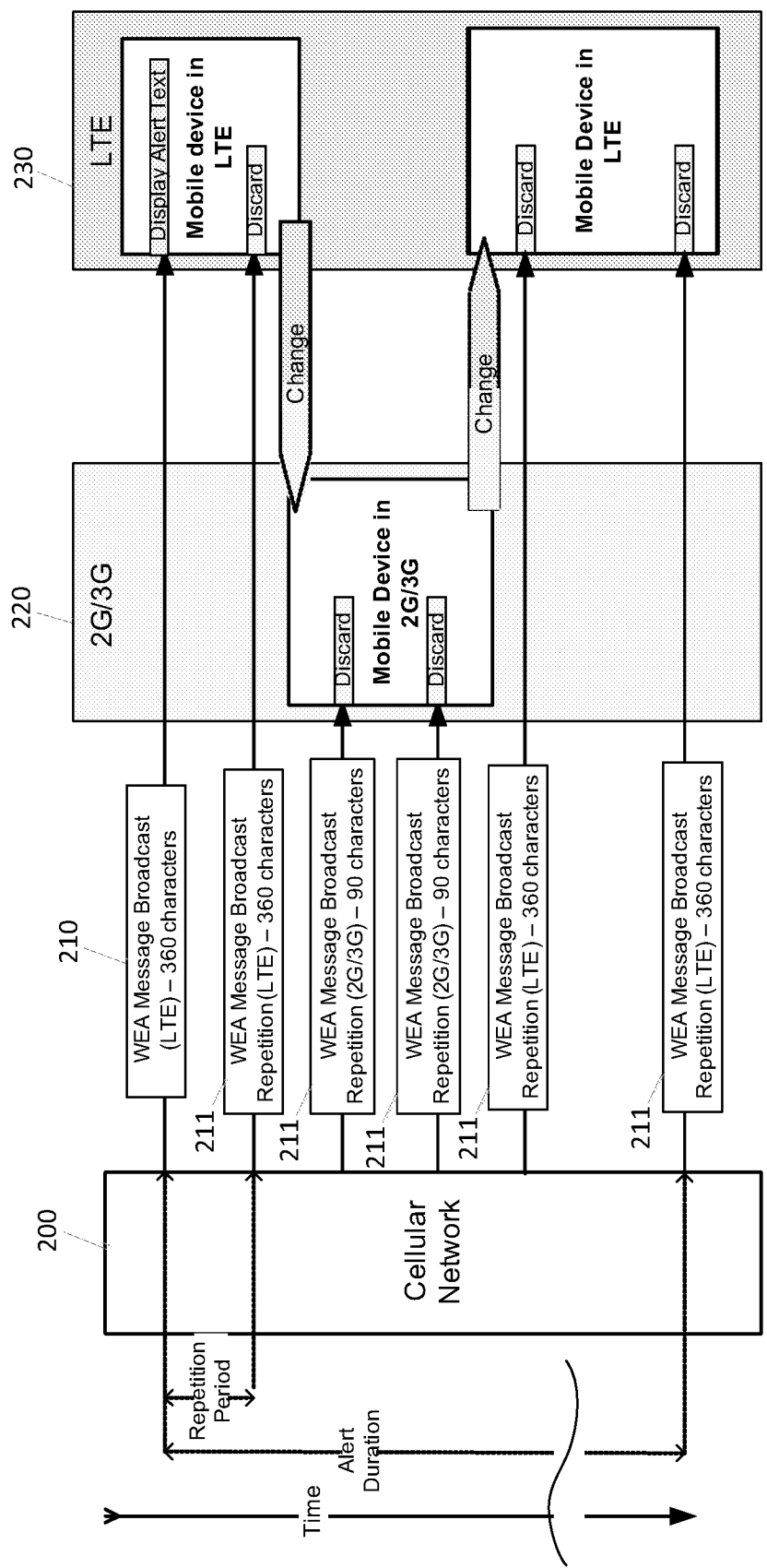
FIG. 7 illustrates an example block diagram depicting the approach where there is a RAN change at a mobile device from LTE network to 2G/3G network.

In an embodiment, a mobile device changing from LTE network 230 to 2G/3G network 220 (even for the first time) may continue to discard the repeated message. The same mobile device changing from 2G/3G network 220 to LTE network 230 subsequently should continue to discard the message already received while in the 2G/3G network 220. FIG. 7 illustrates an example block diagram depicting the approach where there is a radio access network change at the mobile device from the LTE network 230 to the 2G/3G network 220. As illustrated in FIG. 7, a Mobile Device receives the 360-character WEA message while on LTE network 230 and displays the alert text. The mobile device is expected to discard all the subsequently received but repeated messages even if it changes radio access connection to 2G/3G network 220.

In a cell broadcast service (CBS), the duplication detection logic may be based on a Message Identifier and Serial Number combination, as specified in 3GPP TS 23.041. The Message Identifier is a 2-octet value that identifies the source of a WEA message (e.g., Presidential Alert, Imminent Threat Alert, Amber Alert). For a WEA application, the CMSP gateway (GW) derives the Message Identifier value from the alert parameters received from the Federal Alert Gateway. The Serial Number is also a 2-octet value that identifies different concurrent WEA messages originating from the same source (i.e., same Message Identifier) value. The 16 bits of Serial Number may be split as shown below:

| Octet 1 | | | | | | | | Octet 2 | | | | | | | |
|---|---|---|---|---|---|---|---|---|---|---|---|---|---|---|---|
| 7 | 6 | 5 | 4 | 3 | 2 | 1 | 0 | 7 | 6 | 5 | 4 | 3 | 2 | 1 | 0 |
| GS | | Message Code | | | | | | | | | | Update Number | | | |

The Message Code differentiates between CBS messages from the same source and type (i.e., with the same Message Identifier). The Geographical Scope (GS) indicates the geographical area over which the Message Code is unique, and the display mode. The Update Number indicates a change of the message content of the same CBS message, i.e., the CBS message with the same Message Identifier, Geographical Scope, and Message Code. In other words, the Update Number will differentiate between older and newer versions of the same CBS message, within the indicated geographical area. For example, a new CBS message may have Update Number 0000 (in binary, henceforth, will be denoted as 0000B in this disclosure); however, this number may increment by 1 for each update.

3GPP TS 23.041 also provides that the MS/UE will check (1) whether the Serial Number associated with the Message Identifier of the new message matches the Serial Number of any of those messages with the same Message Identifier that have been received and displayed to the subscriber and that are subject to the duplication detection. Additionally, the MS/UE may check (2) other criteria for detecting duplicates. An example of such a criterion is whether the actual contents of the two messages is the same. If criterion 1 is fulfilled and any implemented additional checks (as described in criterion 2) are also met, then the MS/UE will consider the new message as duplicated and ignore it. 3GPP TS 03.041, which is the predecessor of 3GPP TS 23.041), provides that any Update Number eight or less, higher (modulo 16) than the last received Update Number will be considered more recent, and be treated as a new message, provided the mobile has not been switched off. As such, it may be concluded that a change in the Update Number does not necessarily mean a CBS message is updated.

Unlike a generic CBS message, in WEA, the Message Identifier value can also change during an alert update (e.g., imminent level alert to extreme level alert). For this reason, the WEA standards have defined that an alert UPDATE would be treated as a CANCEL plus a NEW ALERT. As a result, the Update Number is always "0000B" for a WEA message.

At least two approaches are contemplated to address 360-character (on LTE) and 90-character (on 2G/3G) WEA messages. These are based on the Message Identifier/Serial Number combination. One approach may include using the same Message Identifier and Serial Number combination for a 90-character and the associated 360-character message— implying that the 90-character and the associated 360 character messages are treated as one message for duplication detection logic. Another approach may include using the different Message Identifier values, one for a 90-character and the other one for associated 360-character message— implying that the a 90-character and the associated 360 character messages are treated as two independent messages for duplication detection logic.

Figure 8:
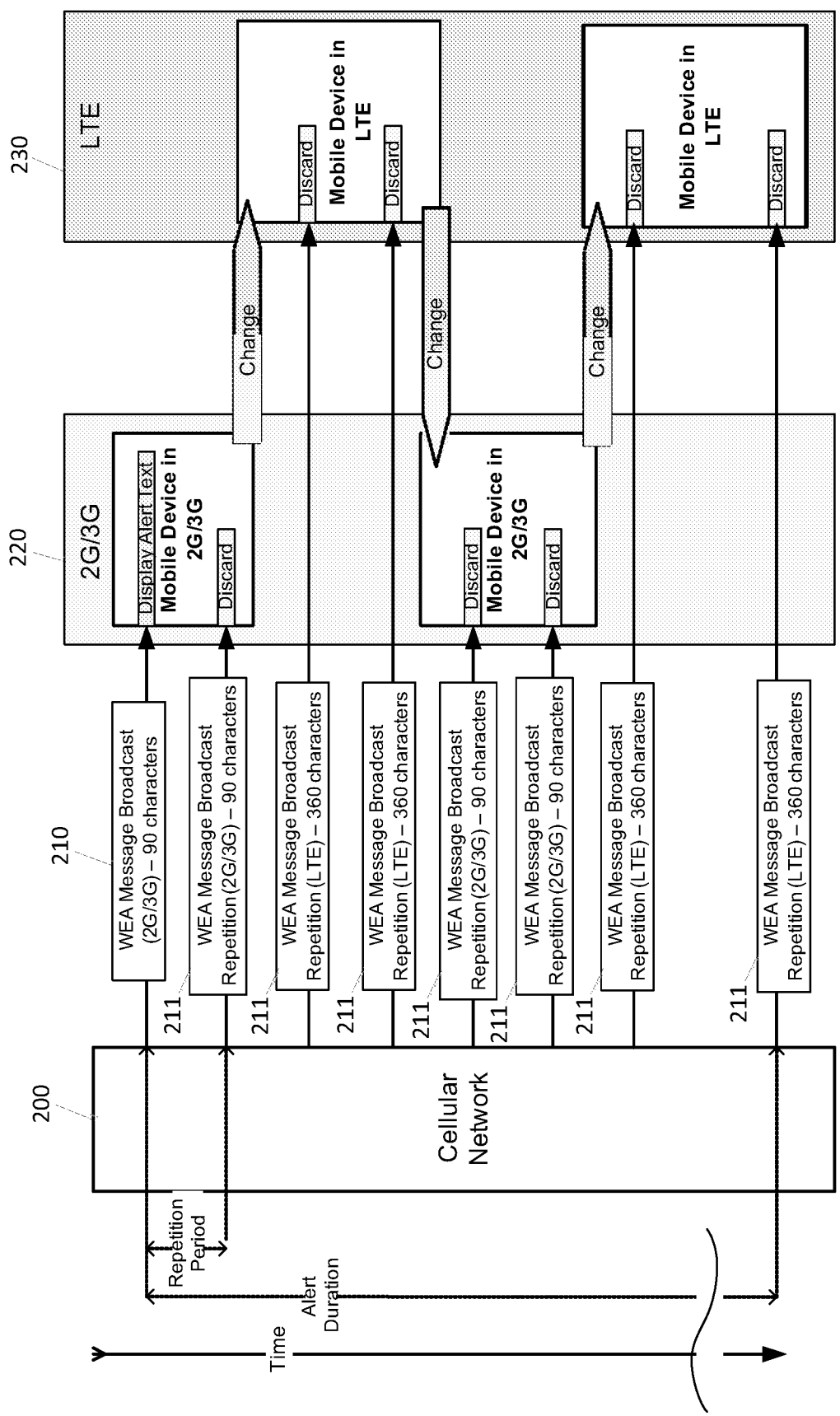
FIG. 8 illustrates another block diagram depicting the case where a short text character message and an associated long text character message are treated as one message.

FIG. 8 illustrates another block diagram depicting the case where a 90-character message and an associated 360-character message are treated as one message. As illustrated in FIG. 8, a mobile device receives the 90-character WEA message while on 2G/3G network 220 and displays the alert text. The mobile device discards all the subsequently received but repeated messages while on 2G/3G network 220. When the mobile device changes its radio access network to LTE network 230, it will end up discarding the 360-character message even the first time. This is different from the behaviour explained above in FIG. 6. The behaviour of the mobile device illustrated in FIG. 8 raises a problem in that the Mobile Device that had received a 90-character message while on the 2G/3G network will discard all the subsequently received repeated messages independent of whether it is a 90-character (2G/3G) or a 360-character message. This is different from the desired mobile device behaviour.

In contrast, when the mobile device receives the 360-character message first (as being on a LTE network), it would continue to discard all the subsequently received repeated messages as illustrated in FIG. 7. This coincides with the desired behaviour for mobile devices.

Figure 9:
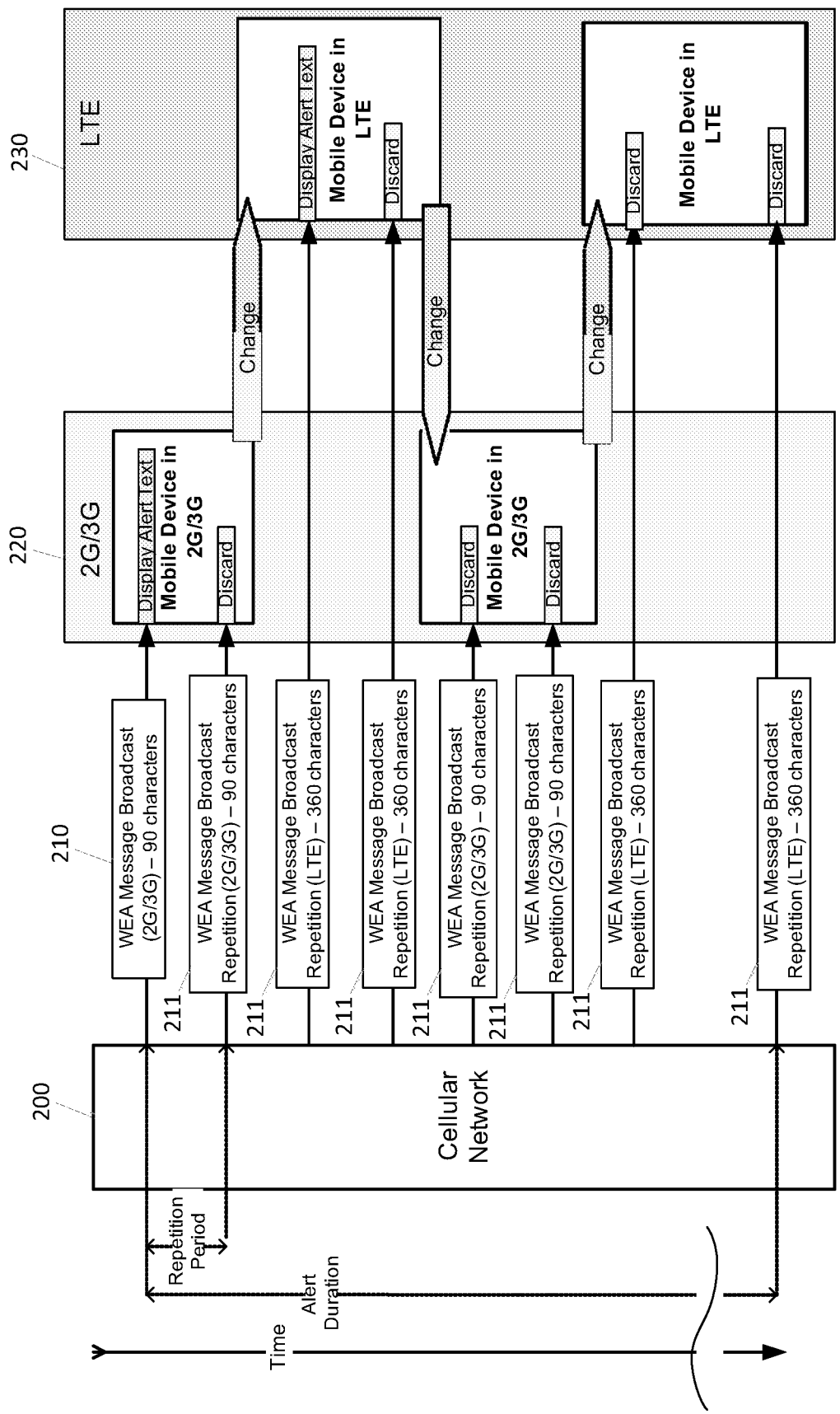
FIG. 9 illustrates an example block diagram of the case where a short text character message and the associated long text character message are treated as two different messages.
Figure 10:
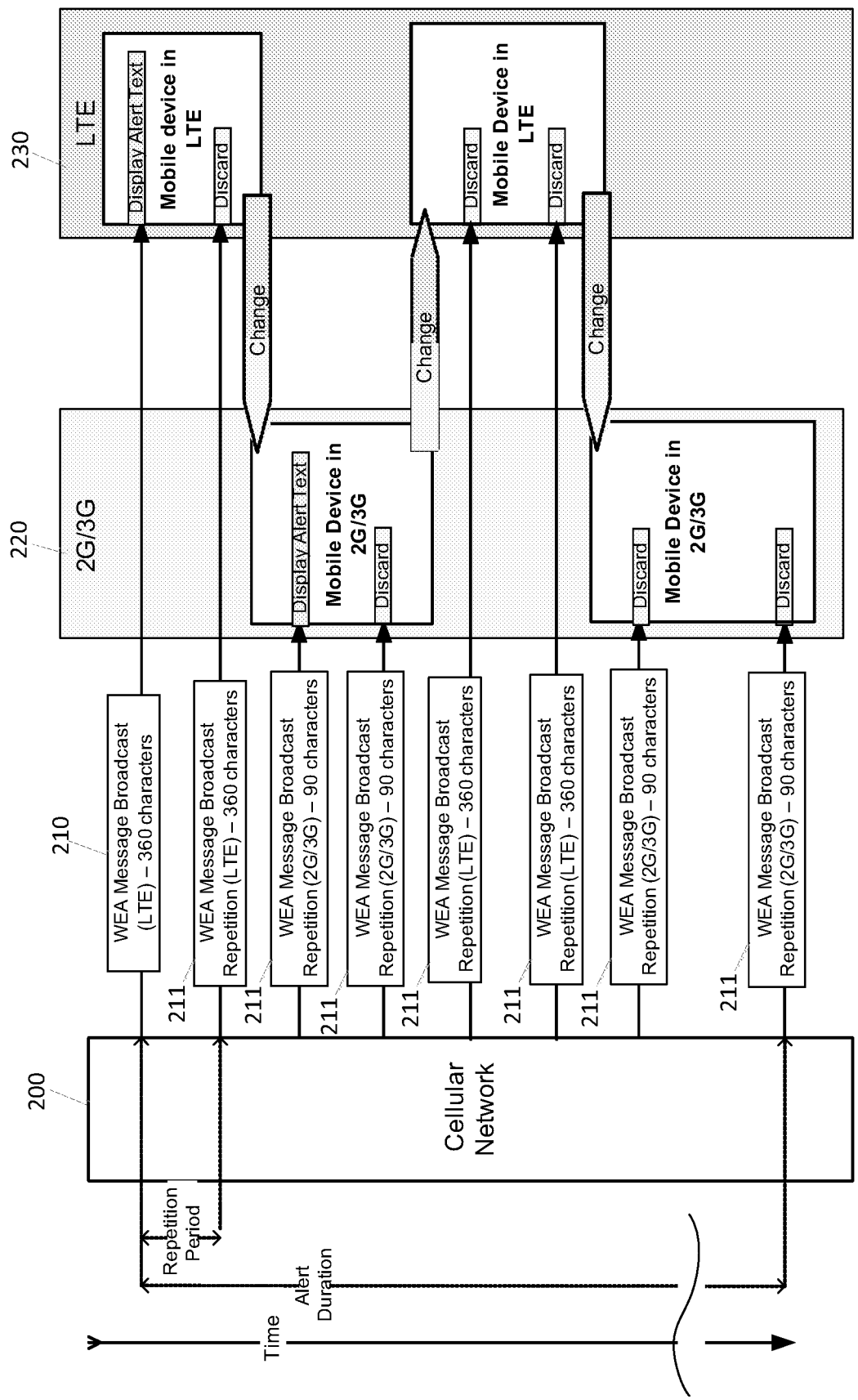
FIG. 10 illustrates another example block diagram of the case where a short text character message and the associated long text character message are treated as two different messages.

FIGS. 9 and 10 illustrate the case where a 90-character message and the associated 360-character message are treated as two different messages. As illustrated in FIG. 9, a mobile device receives the 90-character WEA message while on 2G/3G network 220 and displays the alert text. The mobile device discards all the subsequent repeated messages while on 2G/3G network 220. When the mobile device changes the radio access network to LTE network 230, it will display the first 360-character message it receives after the change and discard all of the subsequently received repeated 360-character message(s). The mobile device will discard all the subsequently received repeated messages independent of the radio access network. This is the desired behaviour as illustrated FIG. 6. As illustrated in FIG. 10, a mobile device receives the 360-character WEA message while on LTE network 230 and displays the alert text. The mobile device discards all the subsequent repeated messages when it receives the same repeated 360-character message while on the LTE network 230. However, the mobile device will receive and display the 90-character message received when it switches its radio access network to 2G/3G network 220. The behaviour of the mobile device illustrated in FIG. 10 raises a problem of when the mobile device that had received a 360-character message while on the LTE network will present the 90-character message when it changes the radio access network to 2G/3G for the first time. This is different from the desired behaviour illustrated in FIG. 7.

In the approach where a 90-character and the associated 360-character message are broadcast using the same Message Identifier and Serial Number combination, the mobile devices do not display the 360-character message if it is received after the mobile device has displayed the 90-character message. This is not the desired behaviour as operators believe public may benefit with the additional information with a 360-character message.

In the approach where a 90-character and the associated 360-character message are broadcast using the two different Message Identifier values, the mobile devices display the 90-character message if it is received after the mobile device has displayed the 360-character message. This is not the desired behaviour as operators believe that displaying a less informative 90-character message after the 360-character message can lead to customer confusion (and hence, complaints) because may think the earlier message is updated or it is a new message.

An embodiment may extend the approach that uses one Message Identifier value for both 90-character messages (sent over 2G/3G) and 360-character messages (sent over LTE). In addition, one embodiment provides a method that uses the Update Number field of the Serial Number to provide the appropriate WEA message(s) to mobile device(s).

As discussed above, the Update Number, which is a 4-bit field, is part of the Serial Number. The Update Number is supposed to be used to notify the mobile devices a change in the content of a CBS message. 3GPP TS 23.041 does not indicate what a mobile is expected to do if the Update Number value in a subsequently received message is less than the Update Number value of a previously received message. However, in a previous specification, 3GPP TS 03.041 states that the if the Update Number in the new message is 8 or less, higher (modulo) than the last received Update Number value, then the new message shall be treated as an update of the last message.

In an embodiment, the term "8 or less, higher" means that the new value can be higher than (up to 8) from the old value. As an example, if the old value is 1, then the numbers 2 to 9 are "8 or less, higher" and the numbers beyond 9 are not. The term "modulo 16" is used because the numbers roll back to 0 once it reaches the value 15 (1111B).

Table 1 below shows the Update Number values of the new message as compared to the last received message that indicate a change in the content:

TABLE 1

New Update Numbers that indicate a change in the content

| Old Update Number | New Update Number indicating change in the content | | | | | | | Ineffective Update Numbers |
|---|---|---|---|---|---|---|---|---|
| 0 | 1 | 2 | 3 | 4 | 5 | 6 | 7 | 8 9 to 15 & 0 |
| 1 | 2 | 3 | 4 | 5 | 6 | 7 | 8 | 9 10 to 15 & 0, 1 |
| 2 | 3 | 4 | 5 | 6 | 7 | 8 | 9 | 10 11 to 15 & 0 to 2 |
| 3 | 4 | 5 | 6 | 7 | 8 | 9 | 10 | 11 12 to 15 & 0 to 3 |
| 4 | 5 | 6 | 7 | 8 | 9 | 10 | 11 | 12 13 to 15 & 0 to 3 |
| 5 | 6 | 7 | 8 | 9 | 10 | 11 | 12 | 13 13, 15 & 0 to 5 |
| 6 | 7 | 8 | 9 | 10 | 11 | 12 | 13 | 14 15 & 0 to 6 |
| 7 | 8 | 9 | 10 | 11 | 12 | 13 | 14 | 15 0 to 7 |
| 8 | 9 | 10 | 11 | 12 | 13 | 14 | 15 | 0 1 to 8 |
| 9 | 10 | 11 | 12 | 13 | 14 | 15 | 0 | 1 2 to 9 |
| 10 | 11 | 12 | 13 | 14 | 15 | 0 | 1 | 2 3 to 10 |
| 11 | 12 | 13 | 14 | 15 | 0 | 1 | 2 | 3 4 to 11 |
| 12 | 13 | 14 | 15 | 0 | 1 | 2 | 3 | 4 5 to 12 |
| 13 | 14 | 15 | 0 | 1 | 2 | 3 | 4 | 5 6 to 13 |
| 14 | 15 | 0 | 1 | 2 | 3 | 4 | 5 | 6 7 to 14 |
| 15 | 0 | 1 | 2 | 3 | 4 | 5 | 6 | 7 8 to 15 |

As an example, as shown in the first row of Table 1, if the old Update Number was 0000B, then only the messages with the Update Number 0001B (=1) to 1000B (=8) which are which are 8 or less, higher than the old number (which is 0) may be treated as an update to the old message. The Update Number values 1001B (=9) to 1111B (=15) & 0000B (=0) do not have an impact. The value of 0000B (=0) would have been given the same Serial Number (i.e., same Message Code, Update Number).

According to one embodiment, where the last received Update Number is Uy and the Update Number in the newly received message is Ux, if Uy<Ux≤(Uy+8) OR Ux≤(Uy+8) Modulo 16, then the new message will be treated as an update of an old CBS message. For example, when the "old value"=1, and a message with a "new value"=2 to 9 is received, the new message should be displayed. However, if the "new value"=10 to 0 (note: 0=16 modulo 16), it may be discarded (as it is possibly an older WEA message).

An embodiment of the present disclosure, therefore, provides that the mobile devices may discard the CBS message if the Update Number value is lower than the Update Number of a previously received message (unless the Update Number changes from 1111B to 0000B (since 0000B is the next value after 1111B)). However, in the current WEA system, the Update Number is not used for WEA messages. That is because a WEA Update is handled differently—CANCEL+NEW ALERT. All new alerts always have the Update Number value "0000" in binary.

As mentioned above, mobile devices should display an WEA message text if the Update Number value is incremented from a previously received WEA message with the same Message Identifier, Geographic Scope and Message Code values. The mobile devices should discard the new WEA message if the Update Number value is not within the range 8 (modulo 16) above the previously received message.

Certain embodiments of the present disclosure use the symbols shown in Table 2 to denote the Message Identifier, Serial Number, Message Code, and the Update Number. It should be noted that the symbols in Table 2 are used to simplify the figures and the related discussions.

TABLE 2

Symbols used herein

| Description | Symbol |
| --- | --- |
| Message Identifier | <M1> |
| Message Code | <C1> |
| Update Number with the value 0000B | <U0> |
| Update Number with the value 0001B | <U1> |
| Update Number with the value xxxxB (where x = 1 or 0) | <Ux> |
| Serial Number with Message Code C1, Update Number U0 | <S0> |
| Serial Number with Message Code C1, Update Number U1 | <S1> |
| Serial Number with the Message Code C1, Update Number Ux | <Sx> |
| Message identifier M1, Serial Number S0 | <M1, S0> |
| Message Identifier M1, Serial Number S1 | <M1, S1> |
| Message Identifier M1, Serial Number Sx | <M1, Sx> |
| Message Identifier M1, Message Code C1 | <M1, C1> |

Serial Number <S0> = <C1> + <U0>
Serial Number <S1> = <C1> + <U1>
Serial Number <Sx> = <C1> + <Ux>
<S0> = <S1> − <U1> + <U0> or <Sx> − <Ux> + <U0>
<S1> = <S0> − <U0> + <U1> or <S0> = <Sx> − <Ux> + <U0>

In a mobile device implementation, to perform the duplication detection, the Message Identifier and Serial Number may be stored locally and used to compare the Message Identifier/Serial Number combination received in a message. When a match is found, the mobile devices conclude that the received WEA message(s) is a repetition of a previously received WEA message.

Figure 11:
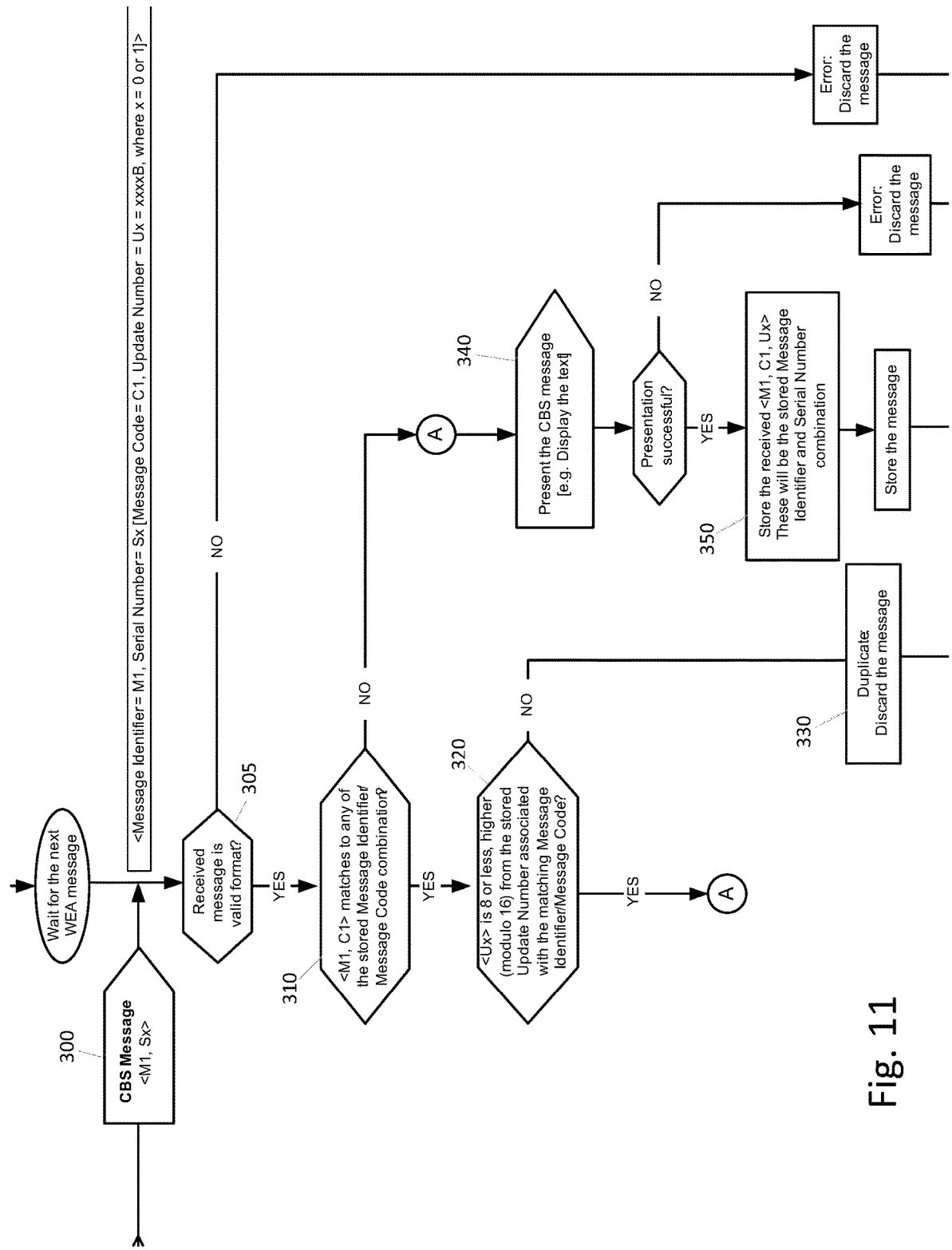
FIG. 11 illustrates an example flow chart of how a mobile device may handle duplication detection, according to an embodiment.

FIG. 11 illustrates an example flow chart of how a mobile device may handle duplication detection. It is noted that the actual implementation may be different depending on the mobile device manufacturer. It is also noted that Geographic Scope may also be used in the duplication detection logic; however, in certain embodiments of the present disclosure, the Geographic Scope is expected to be the same.

Referring to FIG. 11, a CBS message with Message Identifier value of M1 and Serial Number value Sx is received at 300. The Message Code in the Serial Number is C1 and Update Number in the Serial Number is Ux (in binary form it is "xxxx", where x=0 or 1), so that Sx=C1+Ux. The mobile device after passing initial checks, such as checking of the received message is in a valid format at 305 (the mobile device may discard the message if the initial check fails), may check to see whether the <M1, C1> match to any of the stored Message Identifier/Message Code combination at 310. When a match is found, the mobile device will check whether the Update Number received in the CBS message indicates a change in the message content from the last CBS message at 320. If the result of the check at 320 is negative, this implies that the received message is a duplicate of a previously received message and, hence, the mobile device will discard the message at 330.

Figure 12:
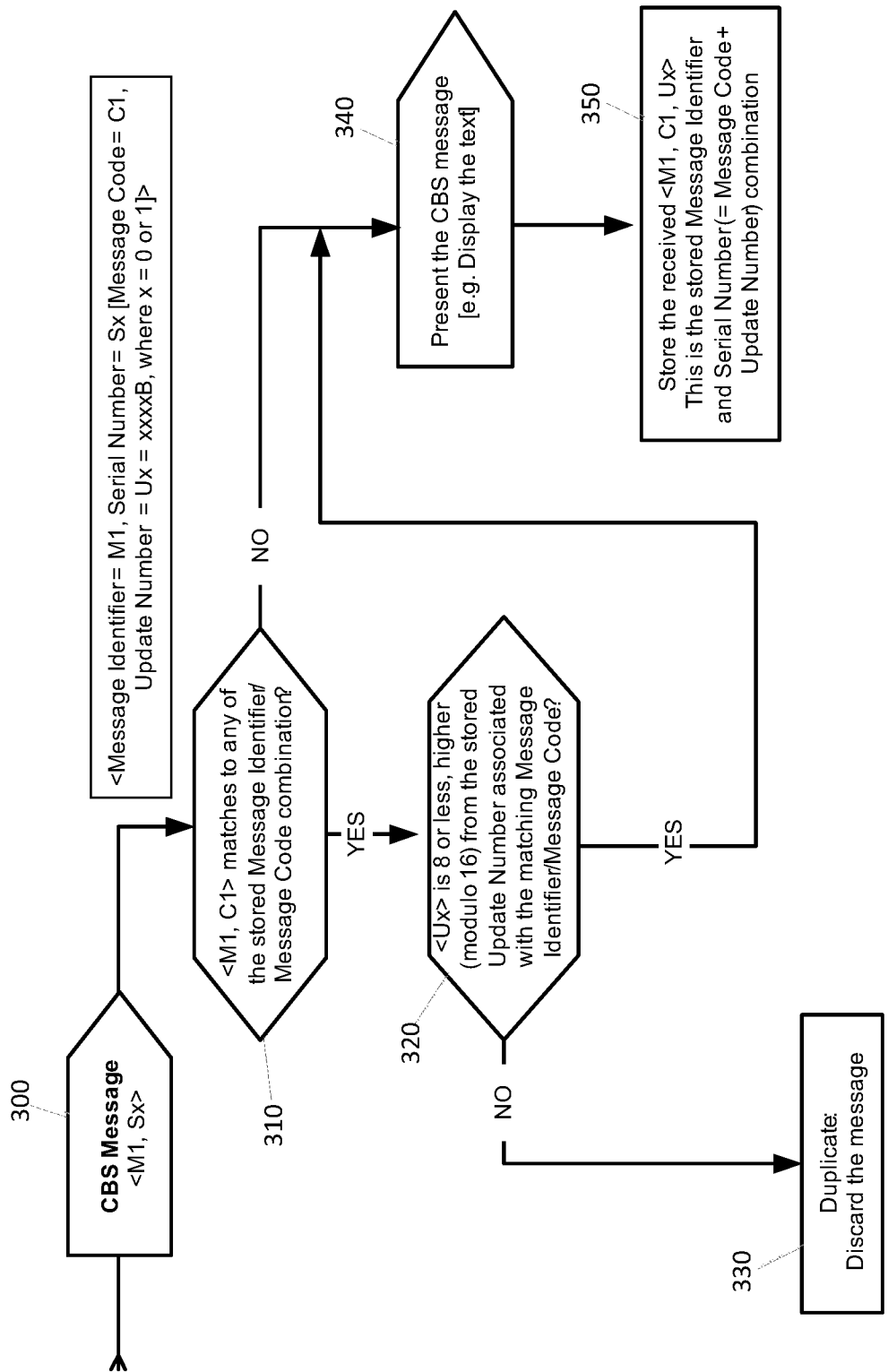
FIG. 12 illustrates another example flow chart focused on duplication detection, according to an embodiment.

FIG. 12 illustrates another example flow chart focused on the duplication detection part of FIG. 11. As illustrated in FIG. 12, if the Message Identifier/Message Code combination of the received message does not match to any of the stored Message Identifier/Message Code combination or the Update Number check indicates the reception of an updated message, then the mobile device will present the CBS message to the user at 340 (e.g., display alert text on the screen). The mobile device may store the M1 as the Message Identifier value, C1 as the Message Code and Ux as the Update Number at 350 (Received Message Identifier=M1, Stored Message Identifier=M1, Received Serial Number=Sx=C1+Ux, Stored Serial Number=Sx=C1+Ux).

In one embodiment, the network may use the value "0000" (in binary) as the Update Number in all the WEA messages that have 90-character text. In other words, for 90-character text, the Message Identifier/Serial Number combination will be of the form: <M1, S0> or <M1, C1, U0>. According to an embodiment, the network may use the value "0001" (in binary) as the Update Number in all the WEA messages that have 360-character text. In other words, for 360-character text, the Message Identifier/Serial Number combination will be of the form: <M1, S1> or <M1, C1, U1>.

According to certain embodiments, the network may broadcast the 90-character WEA message to the mobile devices on 2G/3G network with <M1, S0> as the Message Identifier/Serial Number combination. In an embodiment, the network may broadcast the 360-character message on the LTE network with <M1, S1> as the Message Identifier/Serial Number combination. The mobile devices (e.g., implemented as per 3GPP TS 23.041) may use the value <M1, C1> for the duplication detection and Update Number to determine whether there is a change in the content.

In an embodiment, when a 360-character message is received in mobile device(s) while on LTE after it had received the 90-character message while on 2G/3G, the <M1, C1> would be the same. However, since the Update Number is 0001B, which indicates a change in the content (as illustrated in Table 1), the mobile device(s) may display the 360-character message.

When a 90-character message is received in mobile device(s) while on 2G/3G after it had received a 360-character message while on LTE, the <M1, C1> would be the same. However, since the Update Number is 0000B, which does not indicate a change in the content (as illustrated in Table 1), the mobile device(s) may discard the 90-character message.

As explained with respect to Table 1, for a repeated WEA message to be understood (within the mobile devices) as carrying a new content for display purpose, the new Update Number value will be higher than old Update Number value within the range of 8. The formula(s) that governs this rule, as introduced above, may be:

old Update Number value<new Update Number value≤(old Update Number value+8),
Or
new Update Number value≤(old Update Number value+8) modulo 16.

When the old Update Number value=0000B (=0), the new Update Number value=0001B (=1) is higher than old Update Number value within the range 8. When the old Update Number value=0001B (=1), the new Update Number value=0000B (=0) is not higher (modulo 16) than the old Update Number value within the range 8.

Figure 13:
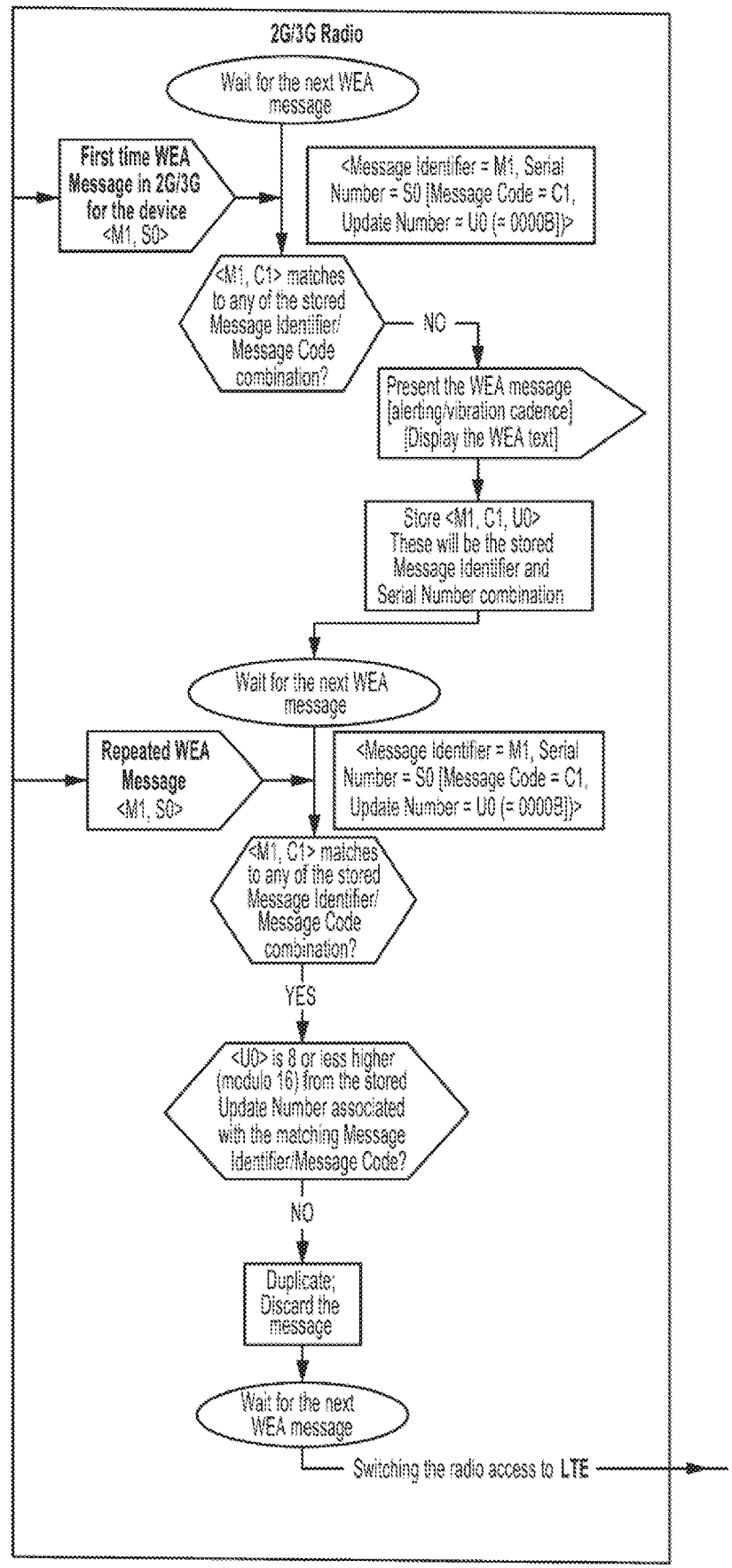
FIG. 13 illustrates an example flow chart depicting the duplication detection logic, when a mobile device (initially on 2G/3G) changes connection to another network, according to another embodiment.
Figure 13:
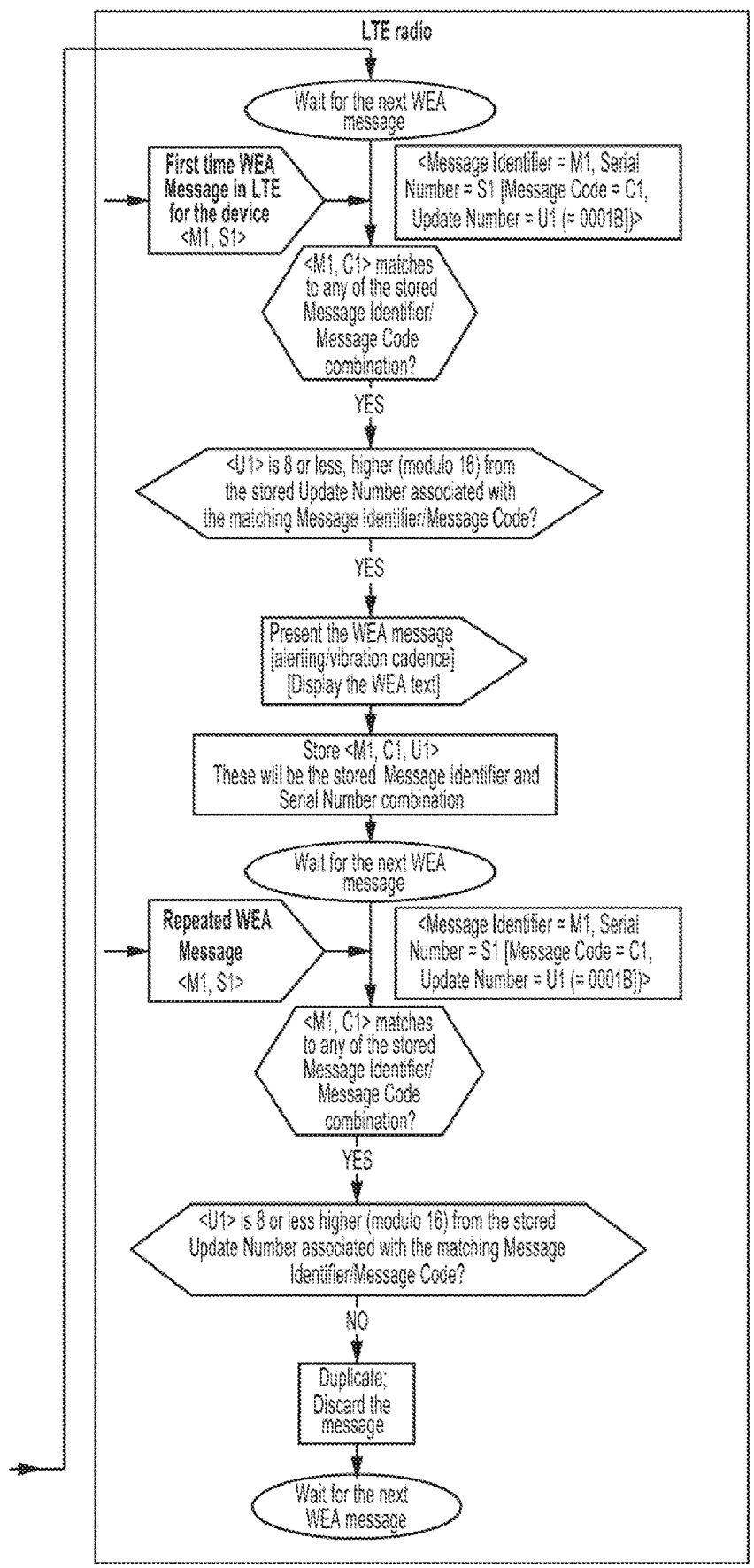

According to one embodiment, the mobile device(s) while on 2G/3G network would receive the 90-character WEA messages with Message Identifier/Serial Number in the format <M1, S0>. The mobile device(s) while on the LTE network would receive the 360-character WEA messages with Message Identifier/Serial Number in the format <M1, S1>. FIG. 13 illustrates an example flow chart depicting the principles of duplication detection logic, when a mobile device (initially on 2G/3G) changes connection based on the approaches illustrated in FIG. 11 and FIG. 12. As illustrated in FIG. 13, <M1, C1> will be the stored Message Identifier/Message Code combination for the 2G/3G mobile device(s) and they match when the network repeats the WEA message with the same Message Identifier/Message Code combination.

When the mobile device(s) switch from 2G/3G to LTE the first time, the Message Identifier/Message Code combination will be the same, but the Update Number of the received message <U1> will meet the criteria of 8 or less, higher (modulo 16) than the stored value (see Table 1). Thus, the mobile device(s) will present the 360-character WEA message to the user.

All the repeated WEA messages may have the same Message Identifier/Message Code combination with Update Number in the format <U1> while on LTE and <U0> while on 2G/3G. Since neither of them meet the criteria of 8 or less, higher (modulo 16) criteria, the mobile device(s) end up discarding the duplicated message.

Figure 14:
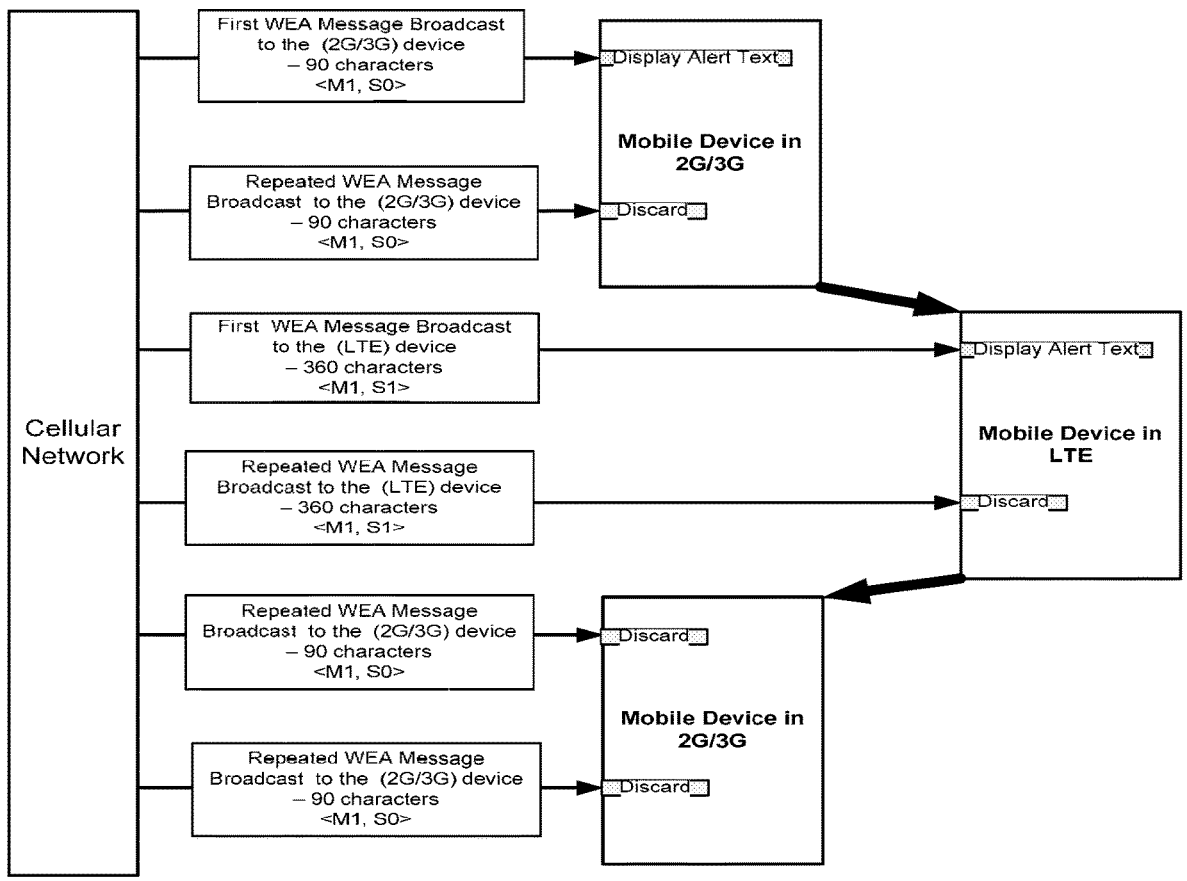
FIG. 14 illustrates an example flow sequence resulting from the flow diagram illustrated in FIG. 13.

FIG. 14 illustrates an example flow sequence resulting from the flow diagram illustrated in FIG. 13. For example, FIG. 14 illustrates that the 90-character WEA message is received and displayed by the mobile device when received first on the 2G/3G radio. All the subsequently received but repeated 90-character messages are discarded while the mobile device is on 2G/3G. FIG. 14 also illustrates that the 360-character WEA message is received and displayed by the mobile device when it switches its radio to LTE, the first time. All the subsequently received but repeated WEA messages are discarded independent of whether the mobile device is on LTE (360-character) or 2G/3G (90-character).

According to another embodiment, the mobile device(s) while on a LTE network would receive the 360-character WEA messages with Message Identifier/Serial Number in the format <M1, S1>. The mobile device(s) while on the 2G/3G network would receive the 90-character WEA messages with Message Identifier/Serial Number in the format <M1, S0>. The principles of duplication detection logic, when a mobile device that is initially on LTE changes connection based on the approaches illustrated in FIG. 11 and FIG. 12, are illustrated in the example flow diagram of FIG. 15.

Figure 15:
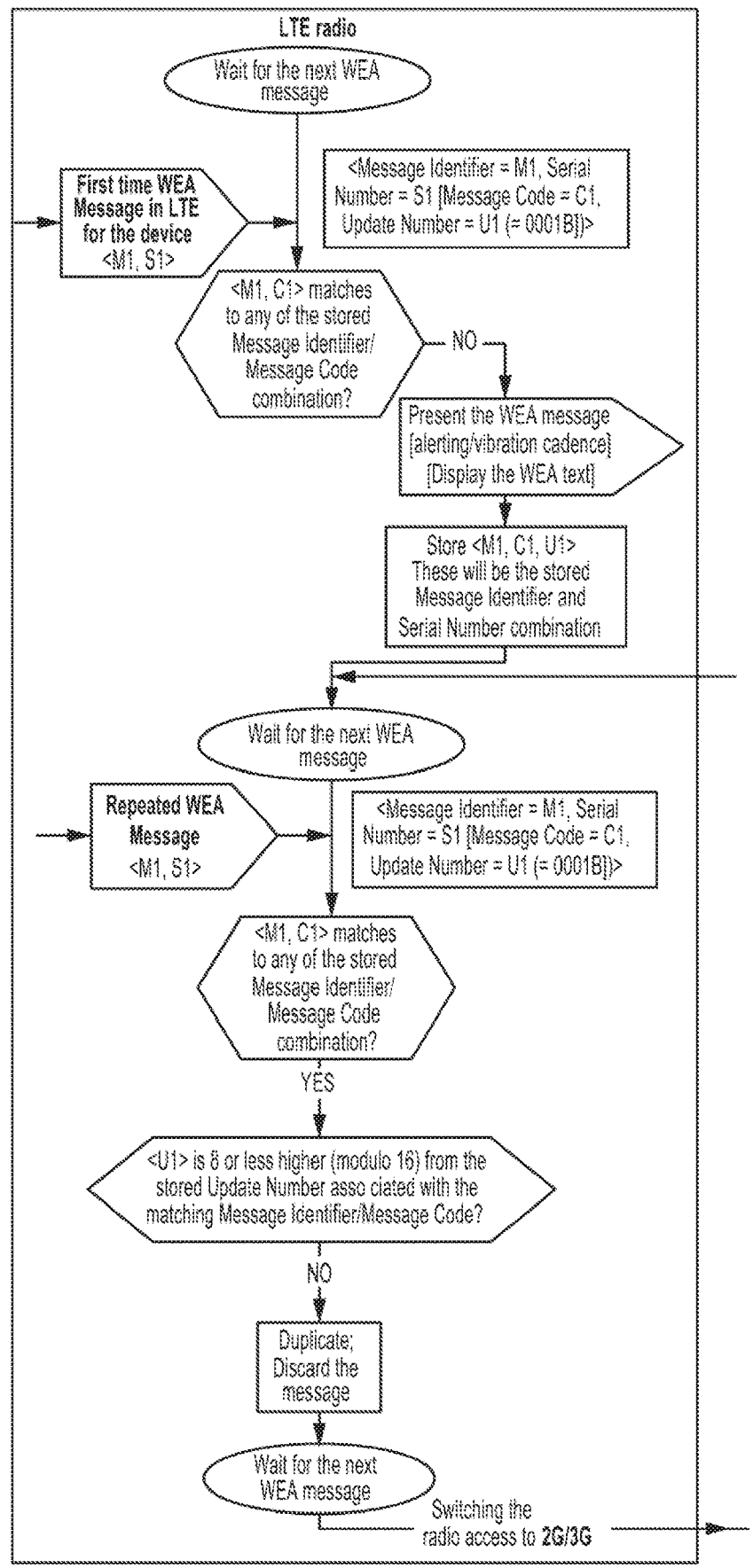
FIG. 15 illustrates an example flow chart of a process depicting the duplication detection logic, when a mobile device (initially on LTE) changes connection to another network, according to another embodiment.
Figure 15:
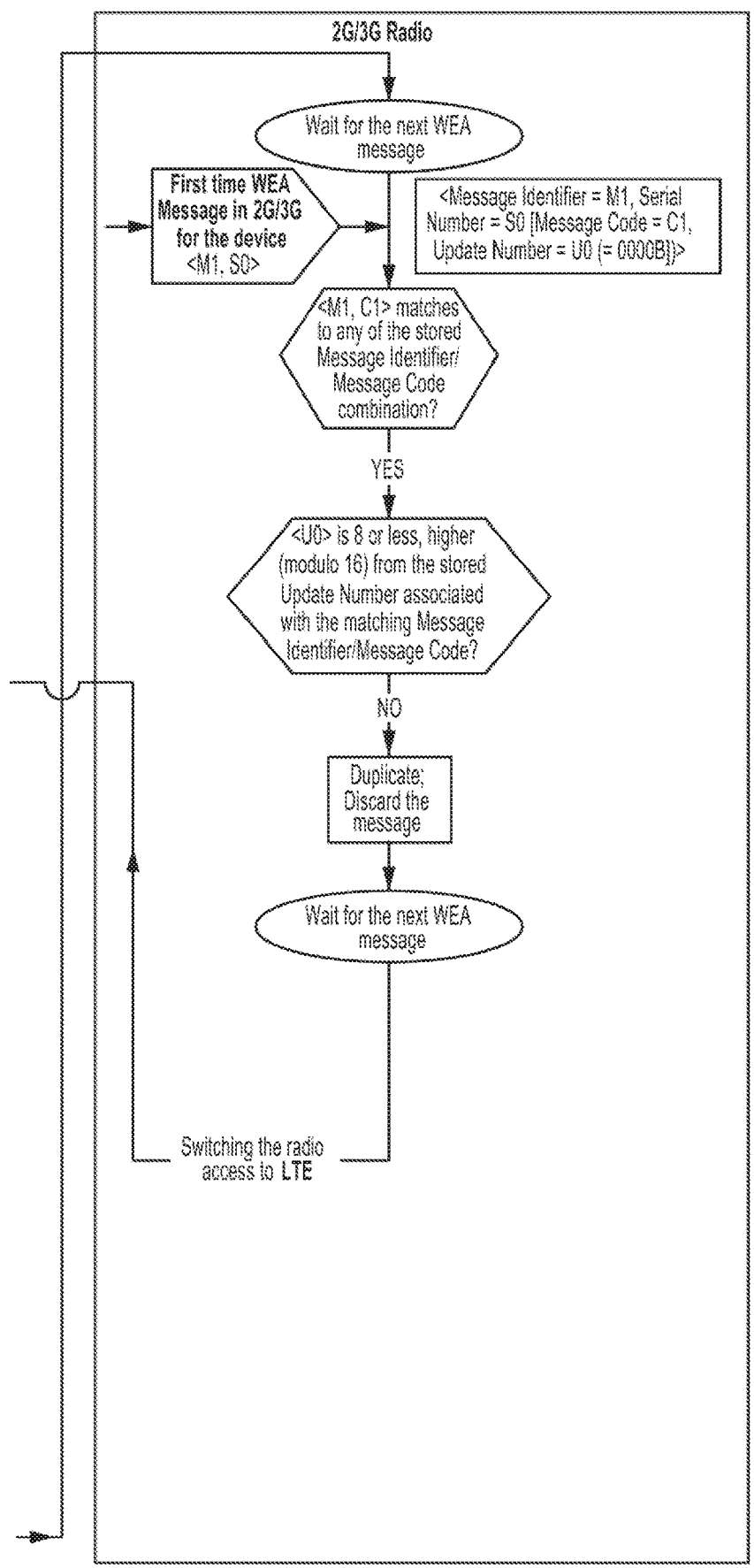

As illustrated in FIG. 15, <M1, C1> may be the stored Message Identifier/Message Code combination for the LTE mobile devices and they match when the network repeats the WEA message with the same Message Identifier/Message Code combination. Furthermore, with the Update Number being in the format <U1>, the mobile device(s) end up discarding all the repeated messages. When the mobile devices switch from LTE to 2G/3G, the Message Identifier/Message Code combination will be the same, and the Update Number of the received message <U0> will not meet the criteria of 8 or less, higher (modulo 16) than the stored value. Thus, the mobile device(s) will discard the WEA messages.

Figure 16:
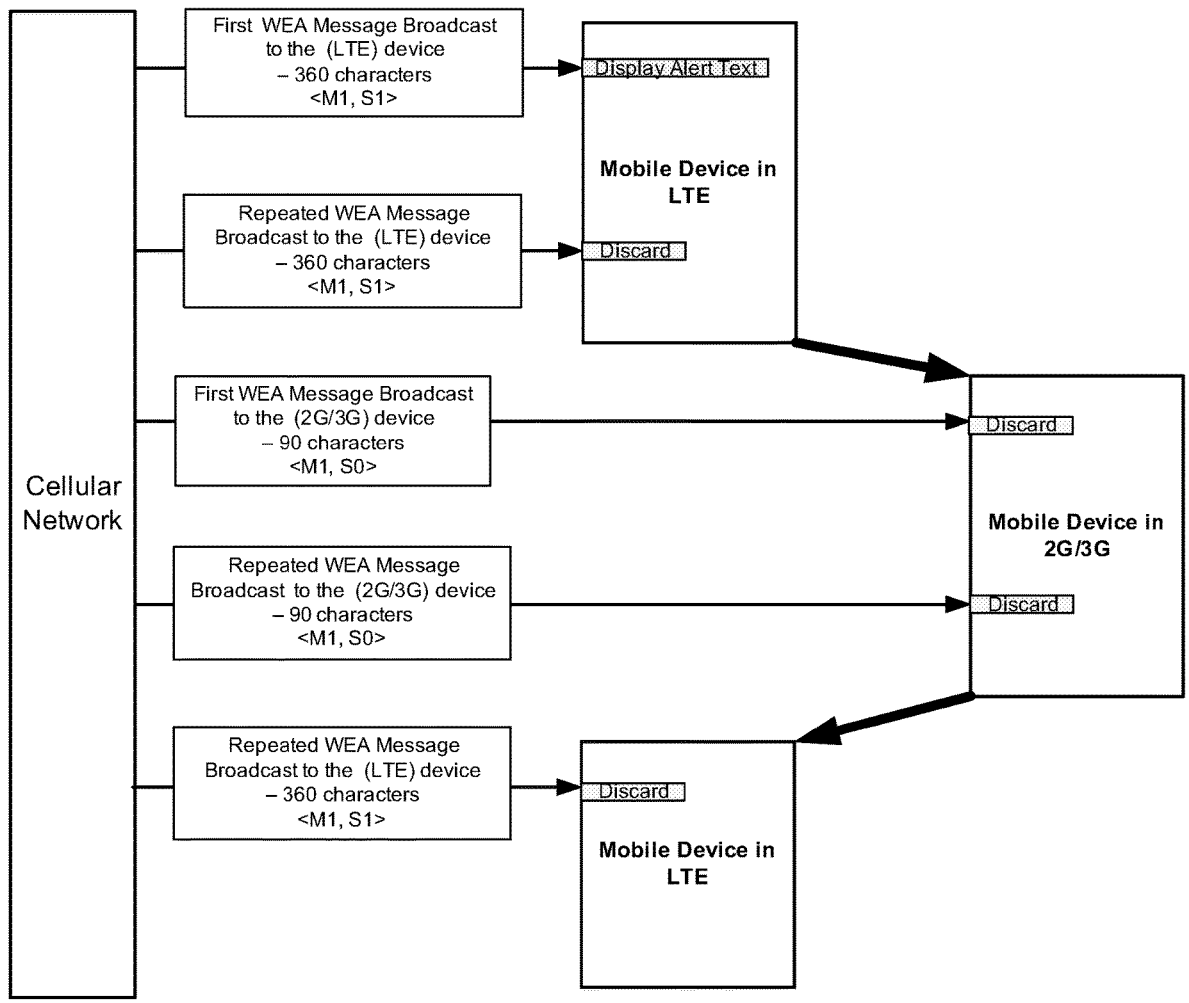
FIG. 16 illustrates an example flow sequence resulting from the flow diagram illustrated in FIG. 15.

FIG. 16 illustrates an example flow sequence resulting from the flow diagram illustrated in FIG. 15. For example, FIG. 16 illustrates that the 360-character WEA message is received and displayed by the mobile device when received first on the LTE radio. All the subsequently received, but repeated 360-character messages are discarded while the mobile device is on LTE. FIG. 16 also illustrates that the associated 90-character WEA message discarded by the mobile device when it switches the radio to 2G/3G even the first time. Then, all the subsequently received, but repeated WEA messages are discarded independent of whether the mobile device is on LTE (360-character) or 2G/3G (90-character).

The 2G/3G mobile device(s) while receiving the 90-character WEA message will always see the value "0000" (in binary) as Update Number and, therefore, with all the subsequently received repeated messages having the same Message Identifier/Serial Number combination, can discard the subsequently received repeated WEA messages. The legacy LTE mobile device(s) while receiving the 360-character WEA message will always see the value "0001" (in binary) as Update Number and, therefore, with all the subsequently received repeated messages having the same Message Identifier/Serial Number combination, can discard the subsequently received repeated WEA messages.

Figure 17:
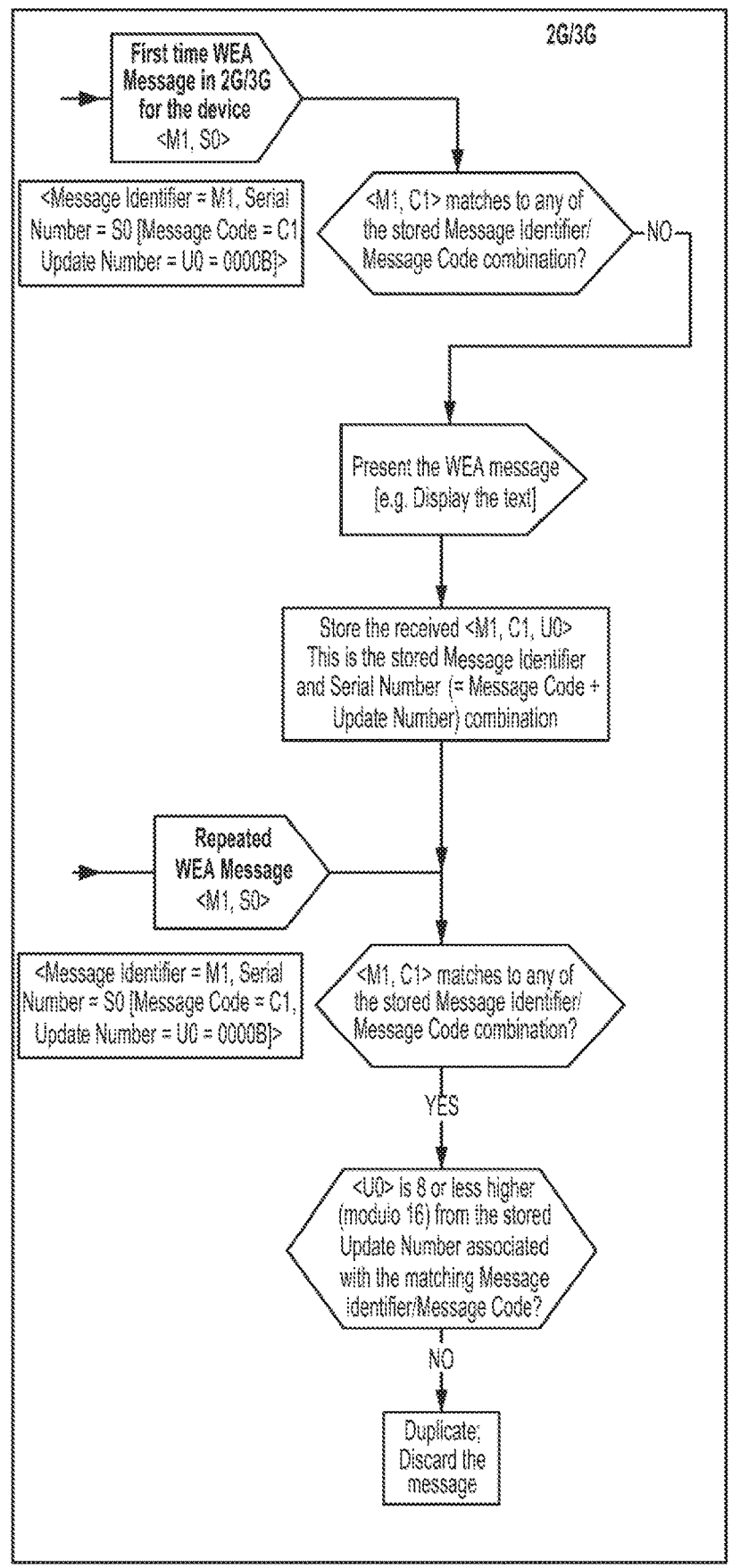
FIG. 17 illustrates an example flow diagram depicting duplication detection logic for mobile devices that stay on one network, according to an embodiment.
Figure 17:
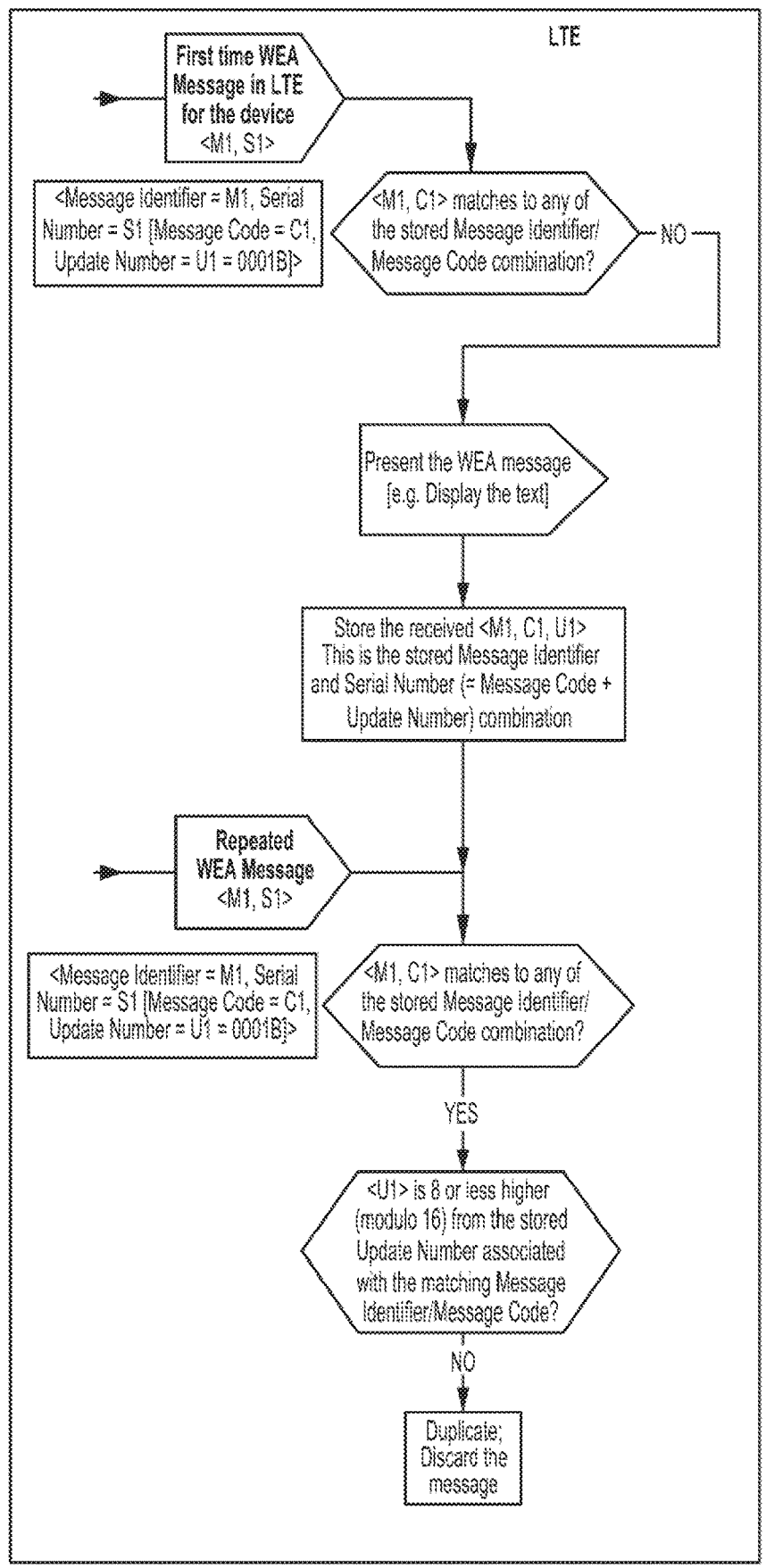

FIG. 17 illustrates an example flow diagram depicting duplication detection logic for mobile devices that stay on one network. As illustrated in FIG. 17, <M1, C1, U0> will be the stored Message Identifier/Serial Number (=Message Code+Update Number) combination in 2G/3G mobile device(s) and they match when the network repeats the WEA message with the same Message Identifier/Serial Number (=Message Code+Update Number) combination. Also, as illustrated in FIG. 17, <M1, C1, U1> will be the stored Message Identifier/Serial Number (Message Code+Update Number) combination in the LTE mobile device(s) and they match when the network repeats the WEA message with the same Message Identifier/Serial Number (=Message Code+Update Number) combination.

Figure 18:
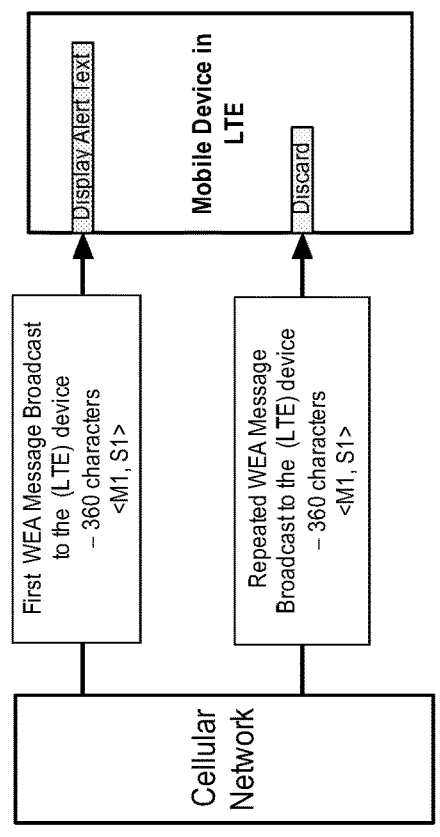
FIG. 18 illustrates an example flow sequence resulting from the flow diagram illustrated in FIG. 17.
Figure 18:
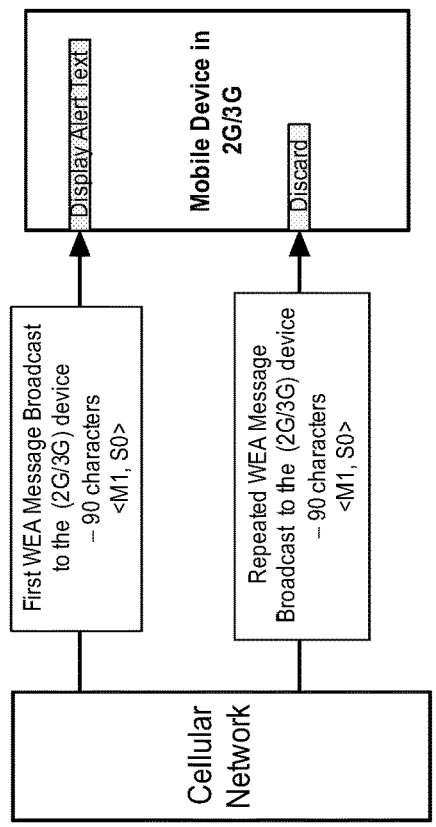

FIG. 18 illustrates an example flow sequence resulting from the flow diagram illustrated in FIG. 17. For example, FIG. 18 illustrates that the 360-character WEA message may be received and displayed by the mobile device when received for the first-time on the LTE radio. All the subsequently received, but repeated 360-character messages are discarded while the mobile device is on LTE. FIG. 18 also illustrates that the 90-character WEA message may be received and displayed by the mobile device when received for the first-time on the 2G/3G radio. All the subsequently received, but repeated 90-character messages are discarded while the mobile device is on 2G/3G.

According to certain embodiments, the mobile device(s) while on 2G/3G network would receive the 90-character WEA messages with Message Identifier/Serial Number in the format <M1, S0>. In an embodiment, the mobile device(s) while on a LTE network would receive the 360-character WEA messages with Message Identifier/Serial Number in the format <M1, S1>. However, in the event a 90-character WEA message is sent to the mobile device(s)

over LTE as well, the network would use the Update Number value "0000B" for the 90-character WEA messages sent over the LTE network (as mentioned above).

In one embodiment, Message Identifier/Serial Number Combination received with the 90-character messages while the mobile device is on 2G/3G radio is: <M1, S0>=<M1, C1, U0>. In an embodiment, Message Identifier/Serial Number Combination received with the 90-character messages while the mobile device is on LTE radio is: <M1, S0>=<M1, C1, U0>.

Since the "new value"=0000B (=0) of the Update Number is same as the "old value"=0000B (=0), the criteria of 8 or less, higher than old value modulo 16 would not be met. As a result, the messages should be discarded.

Figure 19:
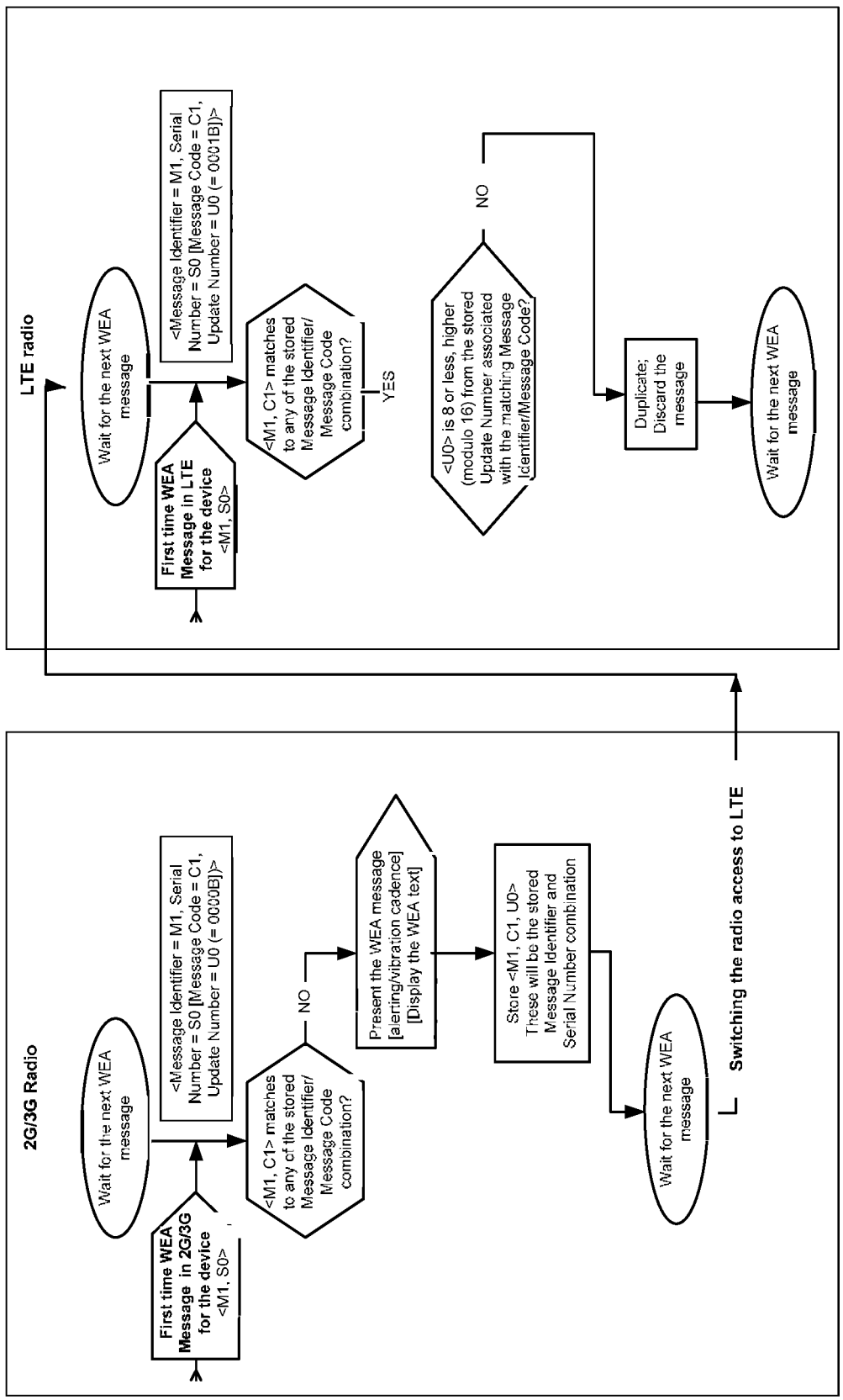
FIG. 19 illustrates an example flow diagram illustrating an approach for duplication detection logic, according to another embodiment.

FIG. 19 illustrates an example flow diagram illustrating an approach for duplication detection logic, when a mobile device (initially on 2G/3G) changes connection based on the approaches illustrated in FIGS. 11 and 12, but continues to receive the 90-character messages. As illustrated in FIG. 19, <M1, C1> is the stored Message Identifier/Message Code combination for the 2G/3G mobile devices. When the mobile devices switch from 2G/3G to LTE, the first time, the Message Identifier/Message Code combination will be the same also the Update Number (U0=0000B). Since <U0> as the new value does not meet the criteria of 8 or less, higher (modulo 16) than the stored value (see Table 1), the mobile devices discard the 90-character WEA messages received over LTE. All the repeated WEA messages will have the same Message Identifier/Message Code combination with Update Number in the format <U0> while on LTE and on 2G/3G. Therefore, the mobile devices keep discarding the repeated 90-character WEA messages.

Figure 20:
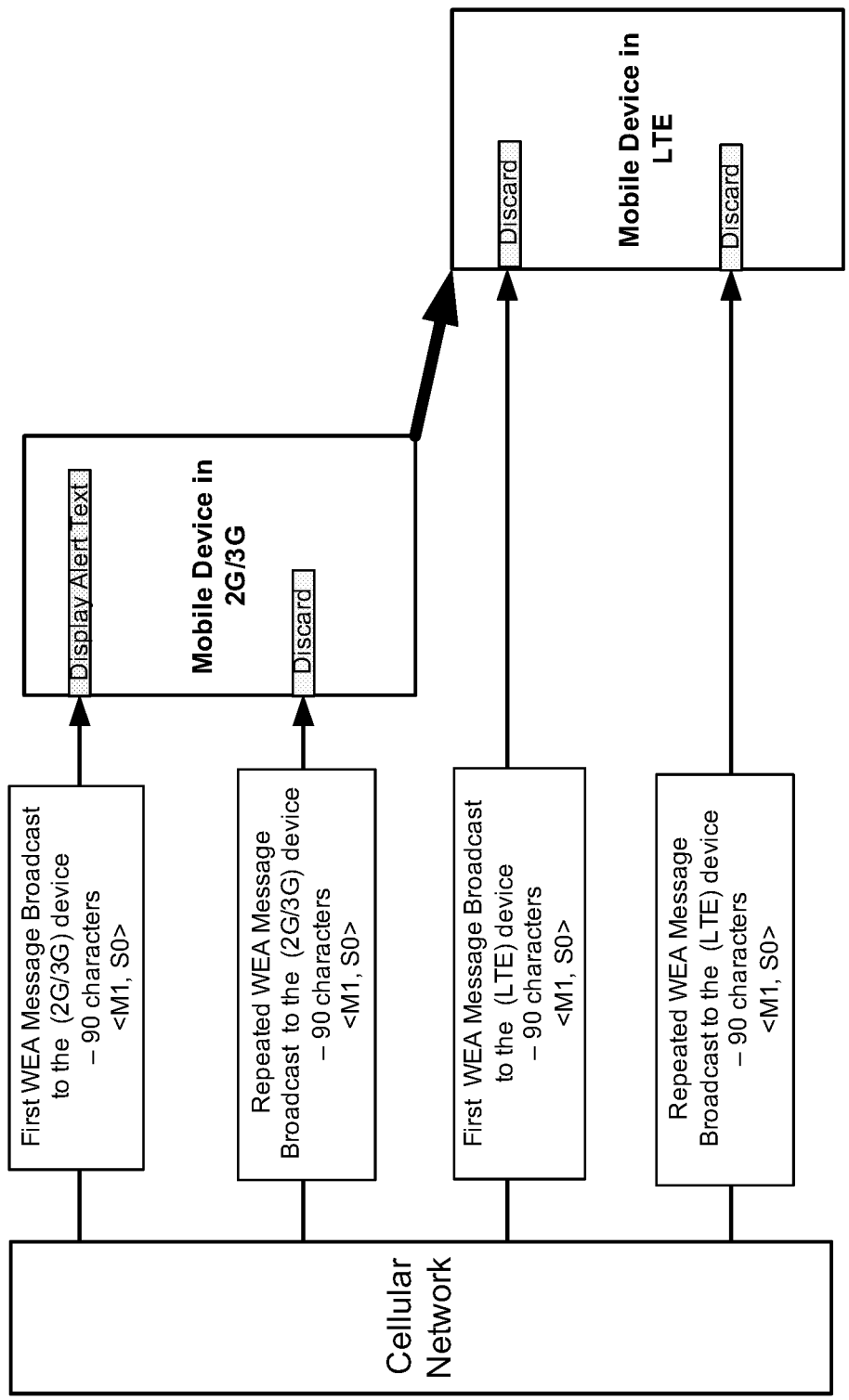
FIG. 20 illustrates an example of the resultant flow sequence resulting from applying the flow diagram of FIG. 19.

FIG. 20 illustrates an example of the resultant flow sequence resulting from applying the flow diagram of FIG. 19. For example, FIG. 20 illustrates that the 90-character WEA message is received and displayed by the mobile device when received first on the 2G/3G network. All the subsequently received, but repeated 90-character messages are discarded while the mobile device is on 2G/3G or switches to LTE radio.

Figure 21:
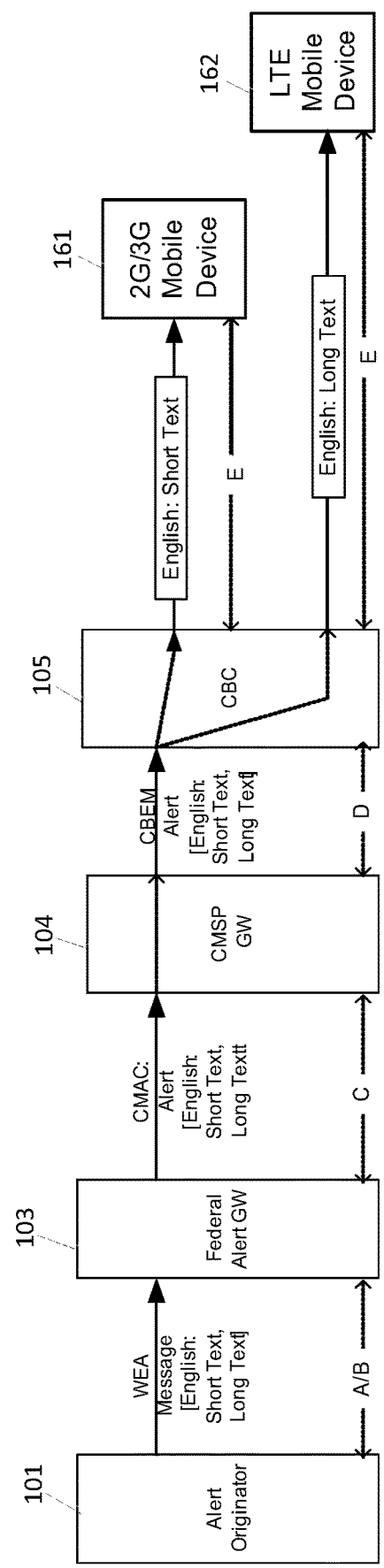
FIG. 21 illustrates an example block diagram depicting the transmission of short text (e.g., 90-character) and long text (e.g., 360-character) WEA messages, according to certain embodiments.

FIG. 21 illustrates an example block diagram depicting the transmission of short text (e.g., 90-character) and long text (e.g., 360 character) WEA messages, according to certain embodiments. As illustrated in FIG. 21, the Federal Alert GW 103 may include both short text and long text in one alert message sent to the CMSP GW 104 over the C-interface. The messages sent over the C-interfaces may be referred to as CMAC messages. As noted above, in one embodiment, the term "short text" may be used, for example, to designate 90-character messages and the term "long text" may be used to designate 360-character messages. It should be noted that, while certain embodiments described herein refer to messages of length 90-character and 360-character, other lengths may be possible according to other embodiments.

Referring again to FIG. 21, the CMSP GW 104 may include both Short Text and Long Text in one command to the CBC 105. The messages sent from the CMSP GW 104 to CBC 105 may be referred to as CBEM messages because in a CBS architecture CMSP GW 104 is a Cell Broadcast Entity (CBE). The CBC 105 may broadcast the Short Text messages to the 2G/3G devices 161 and Long Text messages to the LTE devices 162.

Within the WEA architecture, the CMSP GW 104 may generate the Message Identifier value based on the alert information it receives from the Federal Alert GW 103. Since both Short Text and Long Text are included in one command from the CMSP GW 104 to the CBC 105, the CMSP GW 104 may include one Message Identifier value for Short Text and Long Text messages.

In an embodiment, the CBC 105 may assign the Serial Number. The CBC 105 may then send a command to the BSC/RNC when the WEA messages are to be sent to the 2G/3G devices and sends the command to eNB (via MME) when the WEA messages are to be sent to the LTE devices.

When a WEA Update is received at the CMSP GW 104, the CMSP GW 104 may first cancel the to-be-updated old message and then send the new message to the CBC 105. As such, the CBC 105 does not know if the new message was an update of the old message. All the new messages start with the Update Number 0000B.

According to certain embodiments, the CBC 105 may include the Update Number "0001B" as a part of Serial Number for all Long Text messages and include the Update Number "0000B" as a part of Serial Number for all the Short Text messages. The Message Code part of the Serial Number may be the same for both Short Text and Long Text messages.

Figure 22:
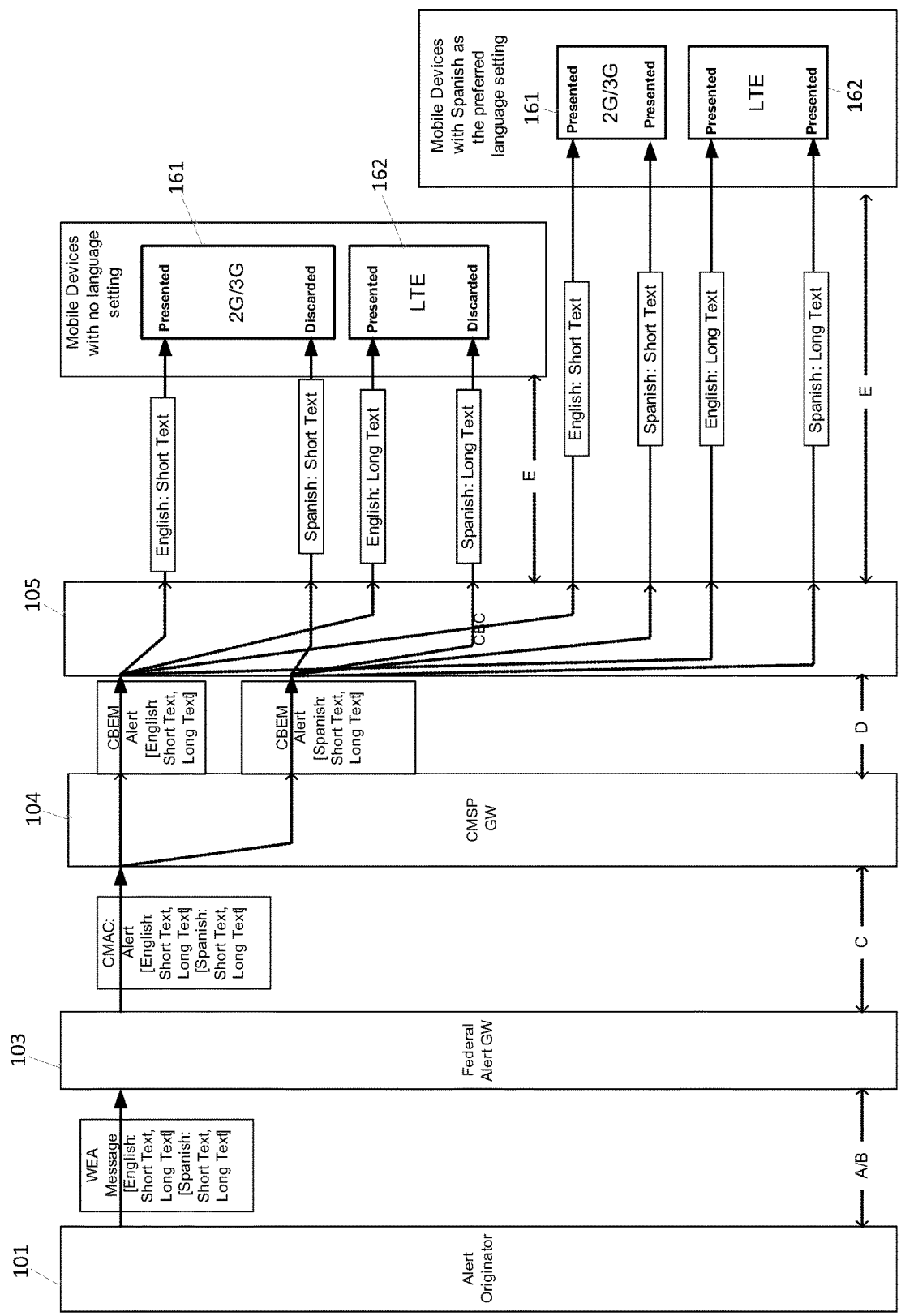
FIG. 22 illustrates an example block diagram depicting the transmission of Short Text and Long Text WEA messages in multiple languages, according to certain embodiments.

FIG. 22 illustrates an example block diagram depicting the transmission of Short Text and Long Text WEA messages in multiple languages, according to certain embodiments. As illustrated in FIG. 22, the Federal Alert GW 103 may send WEA messages in all languages containing Short Text and Long Text within the same command. The example shown in FIG. 22 includes messages in the English and Spanish languages. In an embodiment, the CMSP GW 104 may split the English and Spanish message as two separate WEA messages before sending the same to the CBC 105. The CBC 105 may broadcast the English and Spanish Short Text messages to the 2G/3G devices 161 (via BSC/RNC) and English and Spanish Long Text Messages to LTE devices (via eNB) 162.

In certain embodiments, the CBC 105 may use the Update Number value of 0000B as a part of the selected Serial Number for English Short Text and Spanish Short Text messages. The CBC 105 may use the Update Number value of 0001B as a part of Serial Number for English and Spanish Long Text messages. The Message Code part of the Serial Number may be the same for both Short Text and Long Text messages associated with one language. In other words, the Message Code for English Short Text and English Long Text may be the same. Likewise, the Message Code for Spanish Short Text and Spanish Long text may be the same.

According to one embodiment, the CMSP GW 104 may have assigned different Message Identifier values for the English and Spanish language messages. But English Short Text and English Long Text may have the same Message Identifier value. Likewise, the Spanish Short Text and Spanish Long Text may have the same Message Identifier value.

As discussed above, mobile devices that have implemented the duplication detection logic taking into consideration of both Message Code value and the Update Number value will be able to handle the 90-character and the 360-character messages, as provided by embodiments described herein. In certain embodiments, the Update Number value "0001B" on the 360-character messages and the Update Value "0000B" in the 90-character messages help enable the LTE mobile devices to display when a 360-character message is received the very first time after a mobile that had received the 90-character message switches over to LTE. The Message Code value for both 90-character messages and the 360-character message may remain the same.

In certain embodiments, LTE devices receive the value "0001B" as Update Number in the Serial Number field of 360-character messages. If the network sends 90-character messages to the LTE devices, then the network would include the value "0000B" as the value for the Update Number part of Serial Number field.

The reception of an Update Number value of "0001B" without a prior reception of the Update Number value of "0000B" for the same message should not be considered as an error condition because such a scenario may currently occur when Update Number value is used. For example, a mobile device may miss one or more of the updated messages due to being out of coverage area for a while after receiving an older message or losing power. For example: when the network broadcasts a CBS message with Update Number 0000B, the mobile device may miss it; when the network broadcasts a CBS message with Update Number 0001B, the mobile device may miss it; or when the network broadcasts a CBS message with Update Number 0010B, the mobile device may receive it. Therefore, the reception of Update Number 0010B without a prior reception of 0000B or 0001B is not an error.

According to certain embodiments, international roaming mobile users with the mobile devices purchased elsewhere (but that have implementations of duplication detection logic) would also be able to receive the 90-character and 360-character messages as the non-roaming users, because embodiments described herein do not require any changes to the standard-based mobile devices.

Figure 23A:
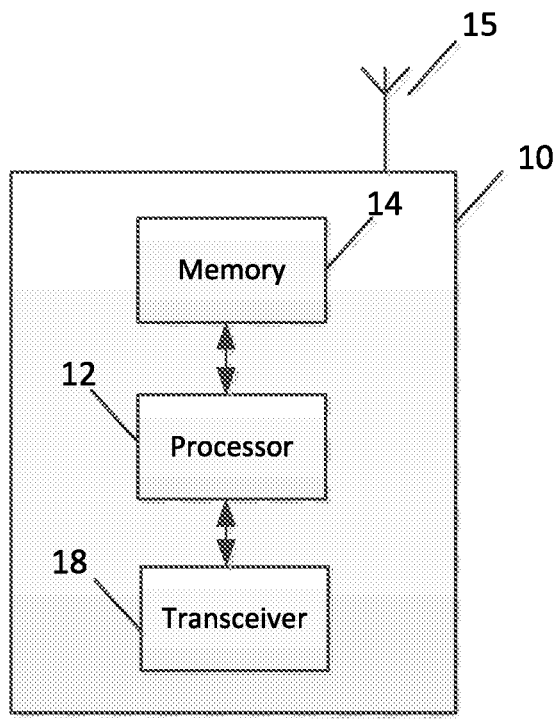
FIG. 23a illustrates a block diagram of an apparatus, according to one embodiment.

FIG. 23a illustrates an example of an apparatus 10 according to an embodiment. In an embodiment, apparatus 10 may be a node, host, or server in a communications network or serving such a network. For example, apparatus 10 may be a base station, a node B, an evolved node B, 5G node B or access point, next generation node B (NG-NB or gNB), WLAN access point, mobility management entity (MME), or subscription server associated with a radio access network, such as a GSM network, LTE network, 5G or NR. In other embodiments, apparatus 10 may be one or more of the network entities illustrated in FIGS. 1 and 21, such as an alert originator, federal alert GW, CMSP GW, or CBC, for example.

It should be understood that apparatus 10 may be comprised of an edge cloud server as a distributed computing system where the server and the radio node may be stand-alone apparatuses communicating with each other via a radio path or via a wired connection, or they may be located in a same entity communicating via a wired connection. It should be noted that one of ordinary skill in the art would understand that apparatus 10 may include components or features not shown in FIG. 23a.

As illustrated in FIG. 23a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 23a, multiple processors may be utilized according to other embodiments. For example, it should be understood that, in certain embodiments, apparatus 10 may include two or more processors that may form a multiprocessor system (i.e., in this case processor 12 represents a multiprocessor) that may support multiprocessing. In certain embodiments, the multiprocessor system may be tightly coupled or loosely coupled (e.g., to form a computer cluster).

Processor 12 may perform functions associated with the operation of apparatus 10 which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port 16 that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink). As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

In certain embodiments, apparatus 10 may be a network node or RAN node, such as a base station, access point, node B, eNB, 5G or new radio node B (gNB) or access point, WLAN access point, or the like. In other embodiments, apparatus 10 may be one or more of the network entities illustrated in FIGS. 1 and 21, such as an alert originator, federal alert GW, CMSP GW, or CBC, for example. According to certain embodiments, apparatus 10 may be controlled by memory 14 and processor 12 to perform the functions associated with any of the embodiments described herein.

For example, in one embodiment, apparatus 10 may be or may be included in a CMSP GW. In this embodiment, apparatus 10 may be controlled by memory 14 and processor 12 to receive both Short Text (e.g., 90-character) and Long Text (e.g., 360-character) (of a WEA message) in one alert message received from a Federal Alert GW, for example, over a C-interface. In an embodiment, apparatus 10 may then be controlled by memory 14 and processor 12 to include both the Short Text and Long Text in one command sent to a CBC. According to one embodiment, apparatus 10 may be controlled by memory 14 and processor 12 to generate the Message Identifier value based on the alert information it receives from the Federal Alert GW. Since both Short Text and Long Text are included in one command from apparatus 10 to the CBC, apparatus 10 may include one Message Identifier value for Short Text and Long Text messages. After receiving the command from apparatus 10, the CBC may broadcast the Short Text messages to 2G/3G devices and Long Text messages to LTE devices. When a WEA Update is received at apparatus 10, apparatus 10 may be controlled by memory 14 and processor 12 to first cancel the to-be-updated old message and then send the new message to the CBC. As such, the CBC does not know if the new message was an update of the old message. All the new messages may start with the Update Number 0000B.

In another embodiment, apparatus 10 may be or may be included in a CBC. In this embodiment, apparatus 10 may be controlled by memory 14 and processor 12 to receive one command, from a CMSP GW, that includes both the Short Text and Long Text of a WEA message. Since both Short Text and Long Text are included in one command from CMSP GW, apparatus 10 may receive one Message Identifier value for Short Text and Long Text messages. After receiving the command from the CMSP GW, apparatus 10 may be controlled by memory 14 and processor 12 to broadcast the Short Text messages to 2G/3G devices and Long Text messages to LTE devices. When a WEA Update is received at CMSP GW, apparatus 10 may be controlled by memory 14 and processor 12 to first receive a cancelation of the to-be-updated old message and then receive the new message from the CMSP GW. As such, apparatus 10 may not know if the new message was an update of the old message. All the new messages may start with the Update Number 0000B.

In an embodiment, apparatus 10 may be controlled by memory 14 and processor 12 to assign the Serial Number. For example, according to one embodiment, apparatus 10 may be controlled by memory 14 and processor 12 to send a command to the BSC/RNC when the WEA messages are to be sent to the 2G/3G devices and send the command to eNB (via MME) when the WEA messages are to be sent to the LTE devices. In certain embodiments, apparatus 10 may be controlled by memory 14 and processor 12 to include the Update Number "0001B" as a part of Serial Number for all Long Text messages and include the Update Number "0000B" as a part of Serial Number for all the Short Text messages. The Message Code part of the Serial Number may be the same for both Short Text and Long Text messages.

In another embodiment, apparatus 10 may be or may be included in a base station, base transceiver station, access point, node B, eNB, and/or gNB, or the like. In this embodiment, apparatus 10 may be controlled by memory 14 and processor 12 to use the value "0000" (in binary) as the Update Number in all the WEA messages that have Short text (e.g., 90-character text). In other words, for Short text, the Message Identifier/Serial Number combination will be of the form: <M1, S0> or <M1, C1, U0>. Apparatus 10 may also be controlled by memory 14 and processor 12 to use the value "0001" (in binary) as the Update Number in all the WEA messages that have Long text (e.g., 360-character text). In other words, for Long text, the Message Identifier/Serial Number combination will be of the form: <M1, S1> or <M1, C1, U1>. In an embodiment, apparatus 10 may be controlled by memory 14 and processor 12 to broadcast the Short text WEA message to mobile devices on 2G/3G network with <M1, S0> (or <M1, C1, U0>) as the Message Identifier/Serial Number combination. In an embodiment, apparatus 10 may be controlled by memory 14 and processor 12 to broadcast the Long text WEA message on the LTE network with <M1, S1> (or <M1, C1, U1>) as the Message Identifier/Serial Number combination.

Figure 23B:
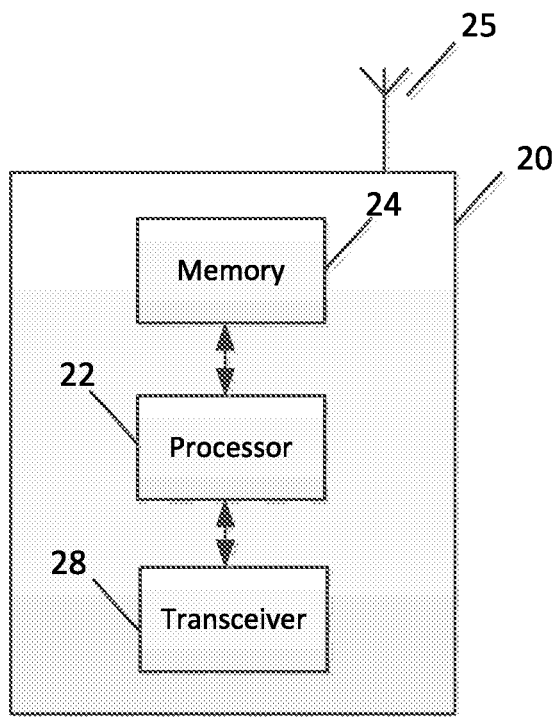
FIG. 23b illustrates another block diagram of an apparatus, according to another embodiment.

FIG. 23b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, Apparatus 20 may be implemented in, for instance, a wireless handheld device, a wireless plug-in accessory, or the like.

In some example embodiments, apparatus 20 may include one or more processors, one or more computer-readable storage medium (for example, memory, storage, and the like), one or more radio access components (for example, a modem, a transceiver, and the like), and/or a user interface. In some embodiments, apparatus 20 may be configured to operate using one or more radio access technologies, such as GSM, NB-IoT, LTE, LTE-A, 5G, WLAN, WiFi, Bluetooth, NFC, and any other radio access technologies. It should be noted that one of ordinary skill in the art would understand that apparatus 20 may include components or features not shown in FIG. 23b.

As illustrated in FIG. 23b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 23b, multiple processors may be utilized according to other embodiments. For example, it should be understood that, in certain embodiments, apparatus 20 may include two or more processors that may form a multiprocessor system (i.e., in this case processor 22 represents a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, without limitation, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 24 can be comprised of any combination of random access memory (RAM), read only memory (ROM), static storage such as a magnetic or optical disk, or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port 26 that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, NB-IoT, LTE, LTE-A, 5G, WLAN, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to one embodiment, apparatus 20 may be a UE, mobile device, mobile station, ME, IoT device and/or NB-IoT device, for example. According to certain embodiments, apparatus 20 may be controlled by memory 24 and processor 22 to perform the functions associated with embodiments described herein. For example, in some embodiments, apparatus 20 may be configured to perform one or more of the processes depicted in the flow charts of FIGS. 11, 12, 13, 15, 17, and/or 19, as discussed above. According to certain embodiments, apparatus 20 may be served by a 2G/3G network or may be served by a LTE network. In an embodiment, when apparatus 20 is in a 2G/3G network, apparatus 20 may be controlled by memory 24 and processor 22 to receive a Short text (e.g., 90-character) WEA message with <M1, S0> as the Message Identifier/Serial Number combination. In an embodiment, when apparatus 20 is in a LTE network, apparatus 20 may be controlled by memory 24 and processor 22 to receive a Long text (e.g., 360-character) message with <M1, S1> as the Message Identifier/Serial Number combination.

In some embodiments, apparatus 20 may be further controlled by memory 24 and processor 22 to use the value <M1, C1> to perform duplication detection and Update Number to determine whether there is a change in the content of a received WEA message. For example, when a Long text (360-character) WEA message is received at apparatus 20 while on LTE after it had received a Short text (90-character) WEA message while on 2G/3G, the <M1, C1> would be the same. However, since the Update Number is 0001B which indicates a change in the content (as illustrated in Table 1), apparatus 20 may be controlled by memory 24 and processor 22 to display the Long text (360-character) WEA message. When a Short text (90-character) WEA message is received at apparatus 20 while on 2G/3G after it had received a Long text (360-character) WEA message while on LTE, the <M1, C1> would be the same. However, since the Update Number is 0000B which does not indicate a change in the content (as illustrated in Table 1), apparatus 20 may be controlled by memory 24 and processor 22 to discard the Short text (90-character) WEA message without displaying it.

In view of the above, embodiments of the invention provide several technical effects, advantages and/or improvements. For example, one advantage of certain embodiments may include that no new messages are required; instead certain embodiments may use existing messages in an innovative way to easily allow the devices that recognize the same WEA message code, but still able to display the 360-character message when received the first time after switching the radio from 2G/3G to LTE. In certain embodiments, the same devices may discard the 90-character message after switching the radio from LTE to 2G/3G even the first time. It is believed that these are important expected behaviours of mobile devices when both 90-character (on 2G/3G) and 360-character (on LTE) messages are in use concurrently.

Without the implementation provided by certain embodiments, the mobile users whose devices may intermittently change connection between 2G/3G or LTE radio may end up either seeing only one message or may end up seeing both messages. If the first displayed message is a 90-character message, then not displaying the 360-character message may suppress some useful additional information that may be important in saving the public property and life. On the other hand, displaying a 90-character message after displaying a 360-character message can confuse the user who may think perhaps the information received in the long message is no longer valid. Other advantages are also possible according to some embodiments. As such, advantages provided by embodiments of the present disclosure are not limited to those discussed herein.

Accordingly, embodiments of the invention can improve the performance and usefulness of network nodes including, for example, mobile devices, UEs, base stations, eNBs, gNBs, and/or the like. Accordingly, the use of embodiments of the invention result in improved functioning of communications networks and their nodes.

In some embodiments, the functionality of any of the methods, processes, signaling diagrams, or flow charts described herein may be implemented by software and/or computer program code or portions of code stored in memory or other computer readable or tangible media, and executed by a processor. For example, in certain embodiments, any of the methods, processes, signaling diagrams, or flow charts described herein may be implemented in software and stored in memory (e.g., memory 14 or memory 24), or stored on a computer readable storage medium (e.g., optical disc, USB drive, flash drive, etc.) and loaded into a drive or port (e.g., drive/port 16 or drive/port 26) for execution by a processor, device or apparatus.

In certain embodiments, an apparatus may be included or be associated with at least one software application, module, unit or entity configured as arithmetic operation(s), or as a program or portions of it (including an added or updated software routine), executed by at least one operation processor. Programs, also called computer program products or computer programs, including software routines, applets and macros, may be stored in any apparatus-readable data storage medium and include program instructions to perform particular tasks.

A computer program product may comprise one or more computer-executable components which, when the program is run, are configured to carry out embodiments described herein. The one or more computer-executable components may include at least one software code or portions of code. Modifications and configurations required for implementing the functionality of an embodiment may be performed as routine(s), which may be implemented as added or updated software routine(s). In some embodiments, software routine(s) may be downloaded into the apparatus.

Software or a computer program code or portions of code may be in a source code form, object code form, or in some intermediate form, and may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and/or software distribution package, for example. Depending on the processing power needed, the computer program may be executed in a single electronic digital device or it may be distributed amongst a number of devices or computers. The computer readable medium or computer readable storage medium may be a non-transitory medium.

In other embodiments, the functionality may be performed by hardware, for example through the use of an application specific integrated circuit (ASIC), a programmable gate array (PGA), a field programmable gate array (FPGA), or any other combination of hardware and software. In yet another embodiment, the functionality may be implemented as a signal, a non-tangible means that can be carried by an electromagnetic signal downloaded from the Internet or other network.

According to an embodiment, an apparatus, such as a node, device, or a corresponding component, may be configured as a computer or a microprocessor, such as single-chip computer element, or as a chipset, including at least a memory for providing storage capacity used for arithmetic operation(s) and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. An apparatus, comprising:
   at least one processor; and
   at least one memory comprising computer program code,
      the at least one memory and computer program code configured, with the at least one processor, to cause the apparatus at least to
   utilize a binary value of 0000 as an update number in wireless emergency alert messages that have short text;
   utilize a binary value of 0001 as the update number in wireless emergency alert messages that have long text;
   broadcast the short text wireless emergency alert message to mobile devices on a second generation or third generation (2G/3G) network; and
   broadcast the long text wireless emergency alert message to mobile devices on a long term evolution (LTE) network.

2. The apparatus according to claim 1, wherein the at least one memory and computer program code are further configured, with the at least one processor, to cause the apparatus at least to broadcast the short text wireless emergency alert message with a Message Identifier/Serial Number combination of <Message Identifier, Message Code, Update Number of binary value 0000>.

3. The apparatus according to claim 1, wherein the at least one memory and computer program code are further configured, with the at least one processor, to cause the apparatus at least to broadcast the long text wireless emergency alert message with a Message Identifier/Serial Number combination of <Message Identifier, Message Code, Update Number of binary value 0001>.

4. The apparatus according to claim 3, wherein the short text wireless emergency alert message comprises 90 characters of text.

5. The apparatus according to claim 3, wherein the long text wireless emergency alert message comprises 360 characters of text.

* * * * *